US010005234B2

(12) United States Patent
Rotter et al.

(10) Patent No.: US 10,005,234 B2
(45) Date of Patent: Jun. 26, 2018

(54) DEVICES, SYSTEMS, AND METHODS FOR COMPACTING A CHARGE OF COMPOSITE MATERIAL ACROSS AN EDGE

(71) Applicant: The Boeing Company, Chicago, IL (US)

(72) Inventors: Daniel M. Rotter, Lake Forest Park, WA (US); Richard V. Phillips, Enumclaw, WA (US); Benjamin J. Stephenson, Seattle, WA (US); Stephen Lee Metschan, Black Diamond, WA (US); Scott K. Frankenbery, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 428 days.

(21) Appl. No.: 14/927,123

(22) Filed: Oct. 29, 2015

(65) Prior Publication Data

US 2017/0120510 A1    May 4, 2017

(51) Int. Cl.
*B29C 65/00*    (2006.01)
*B32B 37/00*    (2006.01)
*B29L 31/30*    (2006.01)

(52) U.S. Cl.
CPC ...... *B29C 66/82661* (2013.01); *B29C 65/004* (2013.01); *B29C 66/8262* (2013.01);
(Continued)

(58) Field of Classification Search
CPC ....... B29C 65/00; B29C 65/004; B29C 66/00; B29C 66/00145; B29C 66/004;
(Continued)

(56) References Cited

U.S. PATENT DOCUMENTS 2,893,581 A    7/1959   Cushman
2,942,745 A    6/1960   Horton
(Continued)

FOREIGN PATENT DOCUMENTS

CN    104016218 A    9/2014
DE    11019029       10/2002
(Continued)

OTHER PUBLICATIONS

Machine generated English translation of the abstract of CN 104016218 A, downloaded from Espacenet.com on Oct. 28, 2016.
(Continued)

*Primary Examiner* — Michael N Orlando
*Assistant Examiner* — Matthew Hoover
(74) *Attorney, Agent, or Firm* — DASCENZO Intellectual Property Law, P.C.

(57) ABSTRACT

Devices, systems and methods for compacting a charge of composite material across an edge are disclosed herein. The devices include a vacuum compaction device including a compaction force transfer structure, a sealing structure, and a vacuum distribution manifold. The compaction force transfer structure includes a first barrier structure, a second barrier structure, and a junction support that extends at least partially between the first barrier structure and the second barrier structure. The junction support is configured to maintain the first barrier structure and the second barrier structure at an angle with respect to one another and to permit limited angular motion of the first barrier structure and the second barrier structure relative to one another. The systems include composite structure fabrication systems that include the vacuum compaction device. The methods include methods of operating the vacuum compaction device.

20 Claims, 9 Drawing Sheets

(52) U.S. Cl.
CPC ............... *B29L 2031/3082* (2013.01); *B29L 2031/3085* (2013.01)

(58) Field of Classification Search
CPC .............. B29C 66/0042; B29C 66/005; B29C 66/0002; B29C 66/80; B29C 66/82; B29C 66/82; B29C 66/826; B29C 66/826; B29C 66/8266; B29C 66/8266; B29C 66/82661; B29C 66/8262; B32B 37/00; B32B 37/10; B32B 37/1018
See application file for complete search history.

(56) References Cited

U.S. PATENT DOCUMENTS

| | | | |
|---|---|---|---|
| 3,054,521 | A | 9/1962 | Harris et al. |
| 3,118,554 | A | 1/1964 | Brainard et al. |
| 3,187,989 | A | 6/1965 | Barto |
| 4,066,249 | A | 1/1978 | Huber et al. |
| 4,129,328 | A | 12/1978 | Littell |
| 5,088,878 | A | 2/1992 | Focke et al. |
| 5,348,602 | A | 9/1994 | Makarenko et al. |
| 6,245,275 | B1 | 6/2001 | Holsinger |
| 6,367,855 | B1 | 4/2002 | Schmaltz et al. |
| 6,431,623 | B1 | 8/2002 | Roeters et al. |
| 6,641,131 | B2 | 11/2003 | Stöhr et al. |
| 7,938,466 | B2 | 5/2011 | Joguet et al. |
| 8,473,094 | B2 | 6/2013 | Becker et al. |
| 8,534,730 | B2 | 9/2013 | Strohmayr |
| 8,556,617 | B2 | 10/2013 | Reinhold et al. |
| 8,857,877 | B2 | 10/2014 | Lin et al. |
| 8,944,481 | B2 | 2/2015 | Collado Jiménez et al. |
| 9,273,800 | B2 | 3/2016 | Angst et al. |
| 2003/0143062 | A1 | 7/2003 | Bennison |
| 2008/0080962 | A1 | 4/2008 | Holtmeier |
| 2010/0078126 | A1* | 4/2010 | Brennan ............... B29C 70/44 156/286 |
| 2011/0139577 | A1 | 6/2011 | Panides et al. |
| 2014/0060732 | A1 | 3/2014 | Shair et al. |
| 2014/0072775 | A1* | 3/2014 | De Mattia ............... B32B 5/26 428/175 |
| 2014/0199153 | A1 | 7/2014 | Reinhold et al. |
| 2014/0367037 | A1 | 12/2014 | Metschan et al. |
| 2014/0367039 | A1 | 12/2014 | Robins et al. |
| 2015/0165699 | A1 | 6/2015 | Carretti et al. |
| 2015/0259159 | A1 | 9/2015 | Herfert |

FOREIGN PATENT DOCUMENTS

| | | |
|---|---|---|
| DE | 102010034720 | 2/2012 |
| DE | 202011100042 U1 | 6/2012 |
| EP | 0163201 | 12/1985 |
| EP | 1905709 A2 | 4/2008 |
| EP | 2412658 A1 | 2/2012 |
| FR | 895153 | 1/1945 |
| FR | 2928855 | 9/2009 |
| WO | WO 2006/043983 | 4/2006 |

OTHER PUBLICATIONS

Machine generated English translation of the abstract of DE 202011100042 U1, downloaded from Espacenet.com on Oct. 28, 2016.
Machine generated English translation of the abstract of FR 2928855, downloaded from Espacenet.com on Jul. 20, 2016.
Machine generated English translation of the abstract of DE 10119029, downloaded from Espacenet.com on Jul. 20, 2016.
Machine-generated English abstract of German Patent No. DE 102010034720, downloaded from Espacenet.com on Jan. 19, 2017.
U.S. Appl. No. 14/189,853, filed Feb. 25, 2014, Rotter et al.
U.S. Appl. No. 14/633,979, filed Feb. 27, 2015, Rotter et al.
Printout of a webpage for Torr Technologies, Inc. for Reusable Vacuum Bagging Systems (Elastomeric Vacuum Tools), www.torrtech.com/Pages/Systems.htm, downloaded on Oct. 29, 2015.
European Patent Office, Extended European Search Report for related European patent application EP 16 18 0278, dated Mar. 28, 2017.

* cited by examiner

DEVICES, SYSTEMS, AND METHODS FOR COMPACTING A CHARGE OF COMPOSITE MATERIAL ACROSS AN EDGE

FIELD

The present disclosure is directed generally to devices, systems, and methods for compacting a charge of composite material and more particularly to devices, systems, and methods that compact the charge of composite material across an edge.

BACKGROUND

Assembly of a composite structure may involve locating a charge of composite material on a layup mandrel and subsequently compacting the charge of composite material on the layup mandrel to form an intermediate structure that includes a compacted charge of composite material and the layup mandrel. The compacting may "debulk" the charge of composite material, decrease a thickness of the charge of the composite material, remove void space from within the charge of composite material, increase adhesion among a plurality of layers, or plies, that may be present within the charge of composite material, increase adhesion between the charge of composite material and the layup mandrel, increase adhesion between the charge of composite material and materials that already may be present on the layup mandrel, and/or otherwise prepare the intermediate structure for further processing.

Historically, the compacting has been accomplished by a "bagging" process, wherein the charge of composite material and a portion of the layup mandrel are covered with a thin, flexible, polymeric sheet. The polymeric sheet then is taped to the layup mandrel to isolate (or at least substantially isolate) an enclosed volume from fluid communication with the ambient environment. Subsequently, a vacuum is applied to the enclosed volume to decrease a pressure therein, and atmospheric pressure acts upon the charge of composite material, via the polymeric sheet, thereby compacting the charge of composite material.

While the above-described procedure may be effective at compacting the charge of composite material, it is a time-consuming, labor-intensive, and material-intensive process that requires custom-fitting the polymeric sheet and manually taping the polymeric sheet to the layup mandrel. In addition, compaction of the charge of composite material onto a surface of the layup mandrel (such as an interior surface thereof) may require oversized polymer sheets that may extend to, past, and/or around a perimeter, or outer perimeter, of the layup mandrel and/or may require correspondingly long lengths of tape so as to prevent contamination of the charge of composite material by the tape. Thus, there exists a need for improved devices, systems, and methods for compacting charges of composite material.

SUMMARY

Devices, systems, and methods for compacting a charge of composite material across an edge are disclosed herein. The devices include a vacuum compaction device including a compaction force transfer structure, a sealing structure, and a vacuum distribution manifold. The compaction force transfer structure includes a first barrier structure, a second barrier structure, and a junction support that extends at least partially between the first barrier structure and the second barrier structure. The junction support is configured to maintain the first barrier structure and the second barrier structure at an angle with respect to one another and to permit limited angular motion of the first barrier structure and the second barrier structure relative to one another.

The systems include composite structure fabrication systems that include the vacuum compaction device. The systems further include a plurality of charges of composite material and a supporting surface.

The methods include methods of operating the vacuum compaction device. The methods include positioning the charge of composite material on the supporting surface and positioning the vacuum compaction device on the supporting surface to define an enclosed volume. The methods further include decreasing a pressure within the enclosed volume, compacting the charge of composite material between the vacuum compaction device and the supporting surface, and increasing the pressure within the enclosed volume.

DESCRIPTION

Figure 1:
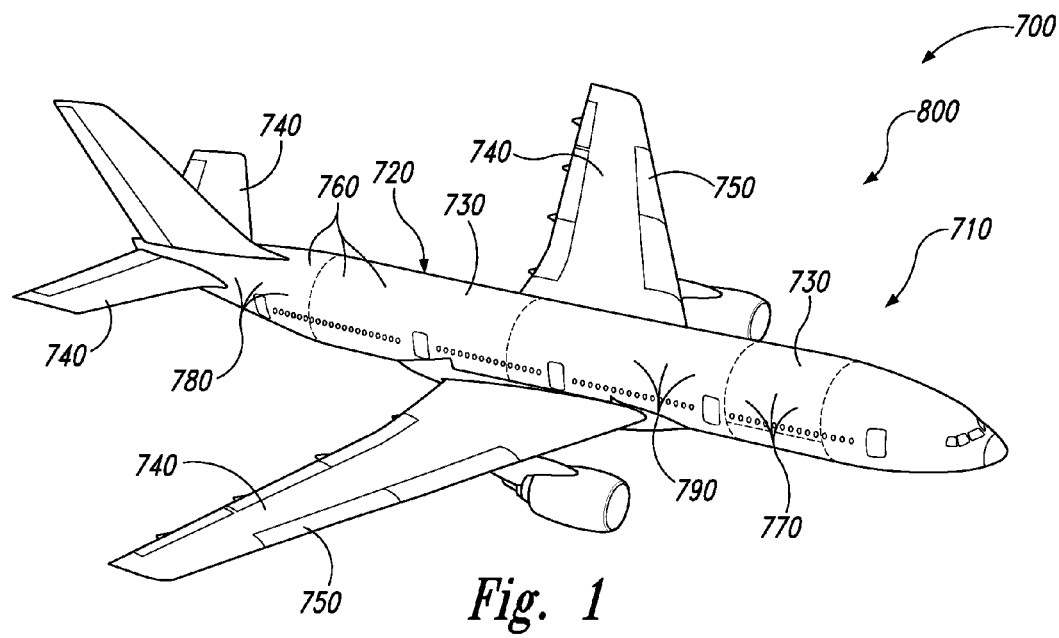
FIG. 1 is an example of an aircraft that includes a composite structure that may be formed using the systems and methods according to the present disclosure.

FIGS. 1-16 provide examples of composite structure fabrication systems 20 according to the present disclosure, of vacuum compaction devices 300 according to the present disclosure, and/or of methods 500, according to the present disclosure, of compacting a charge of composite material on a supporting surface. Elements that serve a similar, or at least substantially similar, purpose are labeled with like numbers in each of FIGS. 1-16, and these elements may not be discussed in detail herein with reference to each of FIGS. 1-16. Similarly, all elements may not be labeled in each of FIGS. 1-16, but reference numerals associated therewith may be utilized herein for consistency. Elements, components, and/or features that are discussed herein with reference to one or more of FIGS. 1-16 may be included in and/or utilized with any of FIGS. 1-16 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
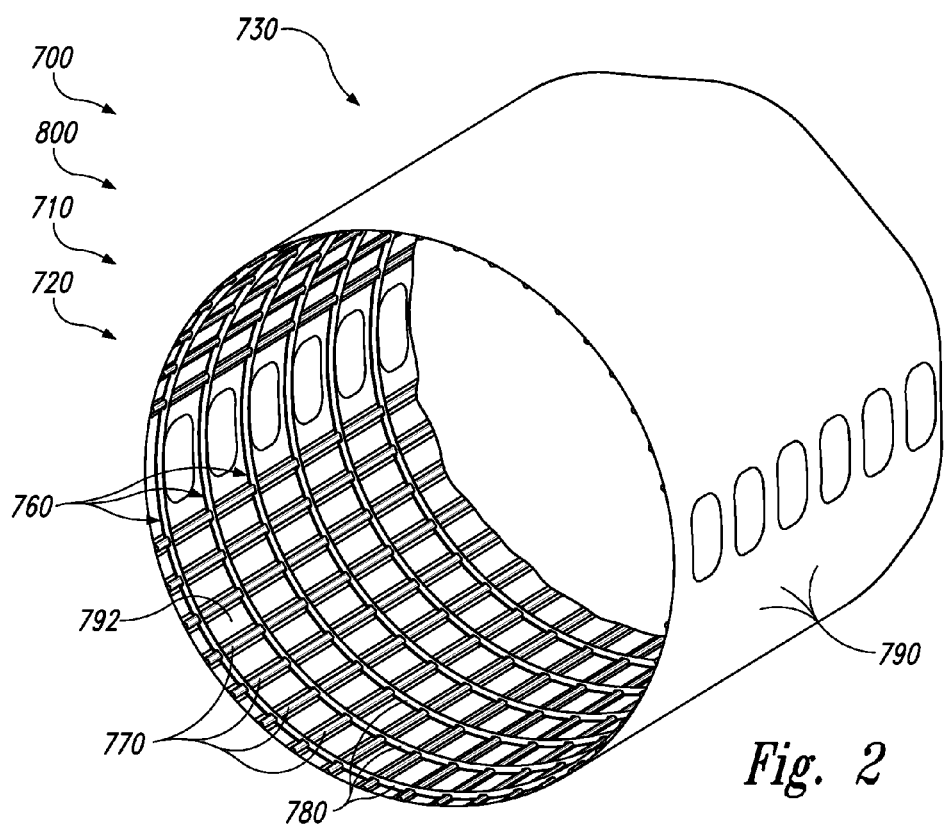
FIG. 2 is an example of a fuselage barrel that includes a composite structure that may be formed using the systems and methods according to the present disclosure.

FIG. 1 is an example of an aircraft 700 that includes a composite structure 800 that may be formed using the systems 20, vacuum compaction devices 300, and/or methods 500 according to the present disclosure, and FIG. 2 is an example of a fuselage barrel 730 that may form a portion of aircraft 700 and includes composite structure 800. Aircraft 700 and/or composite structure 800 thereof may include a plurality of skin segments 790 that may form, cover, and/or be an outer surface of any suitable portion of aircraft 700. As illustrated most clearly in FIG. 2, aircraft 700 also may include a plurality of stringers 770 that, together with a plurality of frames 780, may support an inner surface 792 of skin segments 790. A plurality of fillers 760 may extend between frames 780 and inner surface 792 and may form a portion of composite structure 800.

It is within the scope of the present disclosure that any suitable portion of aircraft 700 may be formed from and/or be composite structure 800. As examples, composite structure 800 may form, or form a portion of, an airframe 710, a fuselage 720, fuselage barrel 730, a wing 740, a stabilizer 750, fillers 760, and/or stringers 770 of aircraft 700. Stringers 770 also may be referred to herein as, or may be, blade stringers 770.

Figure 3:
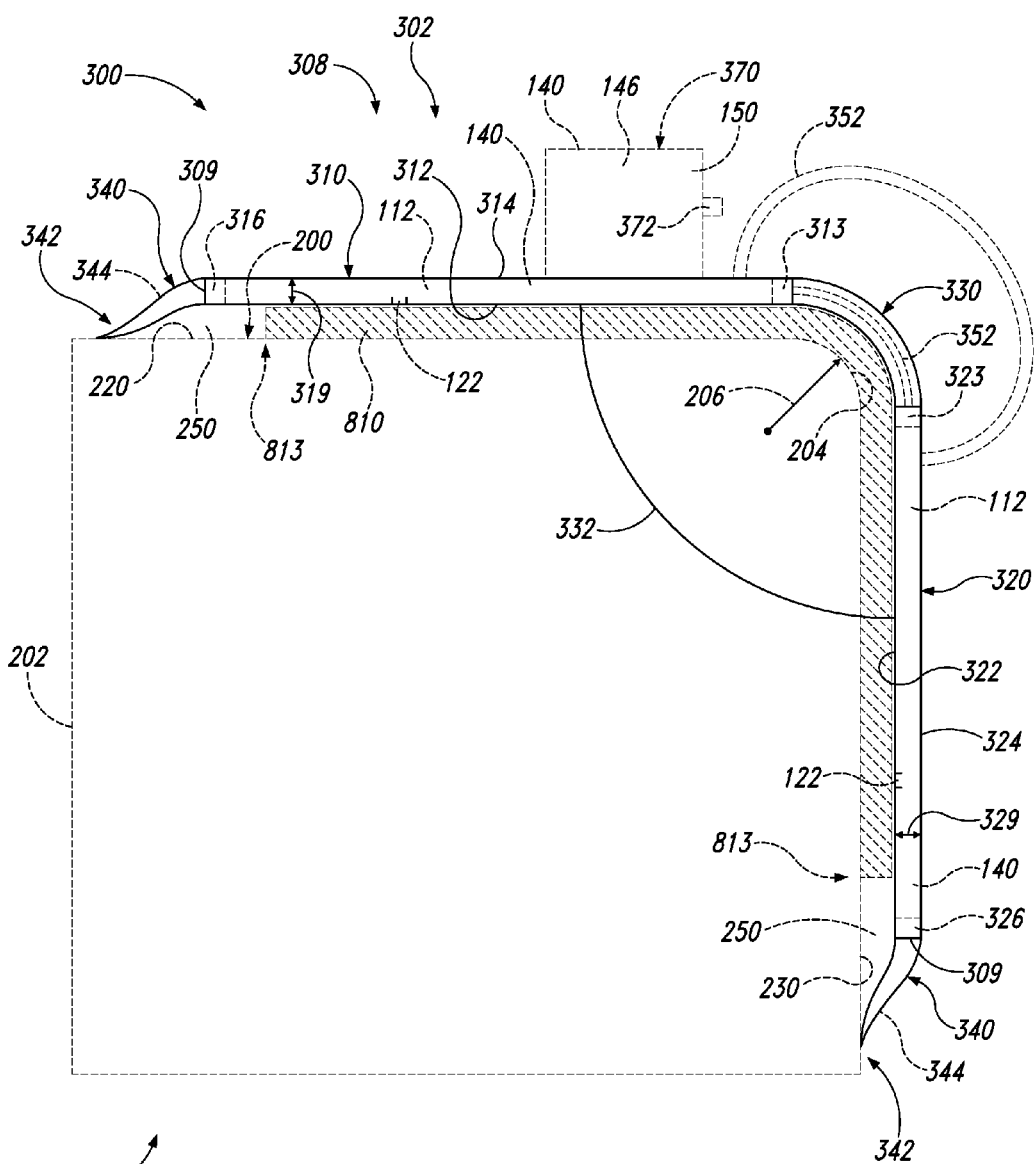
FIG. 3 is a schematic cross-sectional view of a vacuum compaction device, according to the present disclosure, in an undeformed configuration and operatively positioned on a supporting surface to define an enclosed volume.
Figure 4:
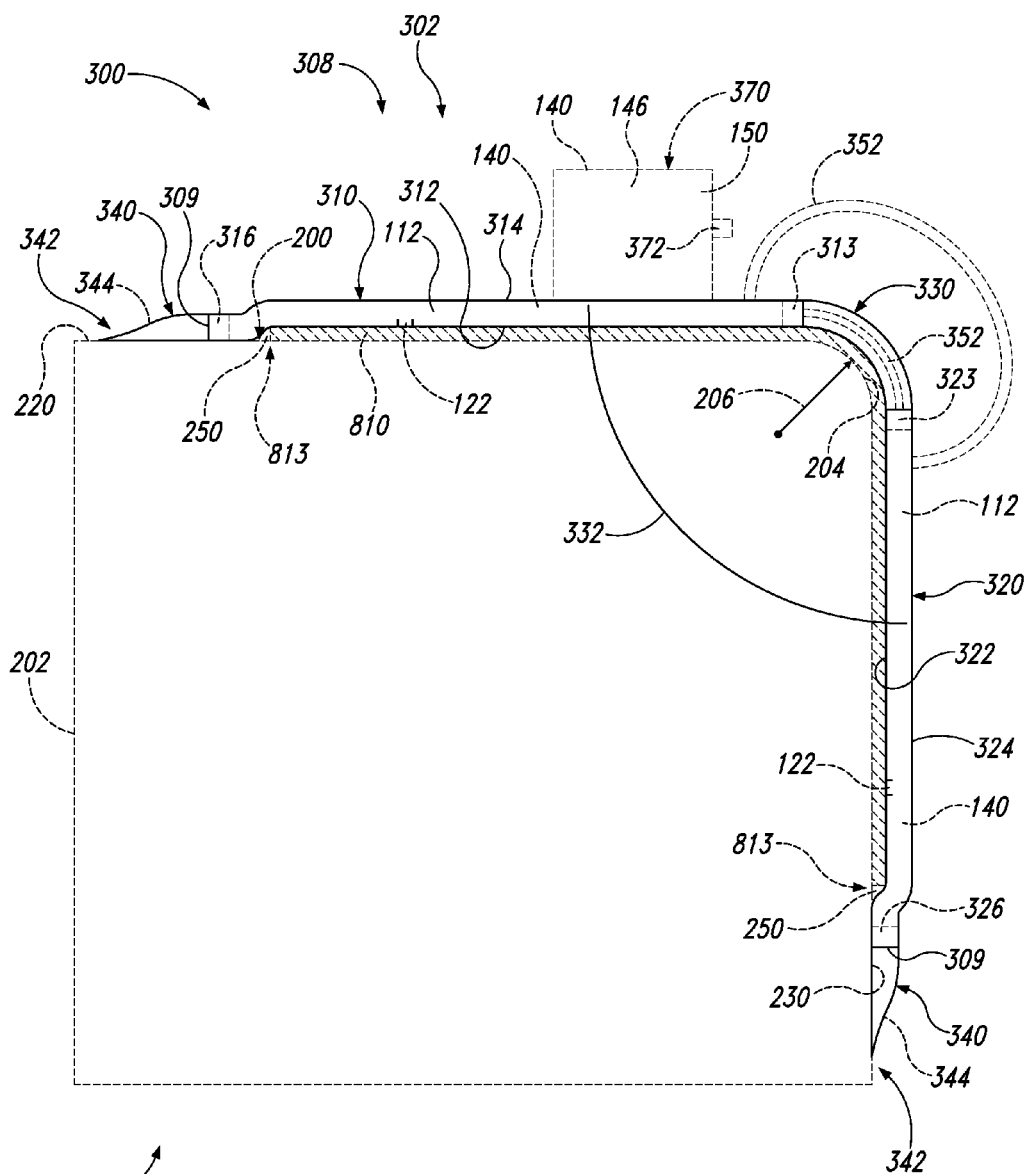
FIG. 4 is a schematic cross-sectional view of the vacuum compaction device of FIG. 3 in a deformed configuration.
Figure 5:
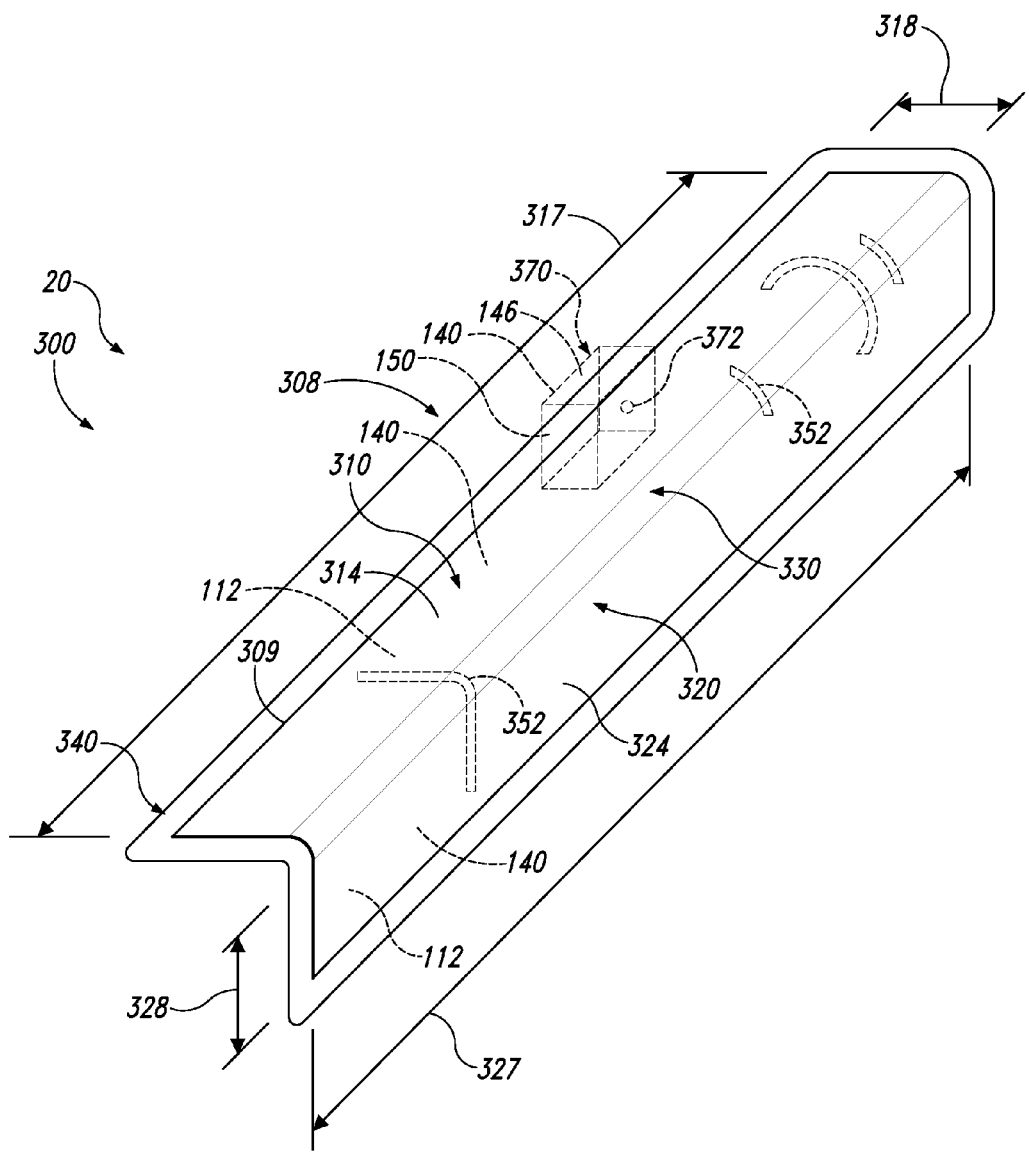
FIG. 5 is a schematic profile view of the vacuum compaction device of FIGS. 3-4.

FIGS. 3-5 are examples of vacuum compaction devices 300 according to the present disclosure. More specifically, FIG. 3 is a schematic cross-sectional view of vacuum compaction devices 300 in an undeformed configuration 302, FIG. 4 is a schematic cross-sectional view of vacuum compaction devices 300 of FIG. 3 in a deformed configuration 304, and FIG. 5 is a schematic profile view of vacuum compaction devices 300 of FIGS. 3-4. Vacuum compaction devices 300 also may be referred to herein as devices 300, as compaction devices 300, as charge compaction devices 300, as edge compaction devices 300, as angled compaction devices 300, and/or as corner compaction devices 300.

As illustrated in FIGS. 3-4, vacuum compaction devices 300 may be adapted, configured, sized, shaped, and/or constructed to compact a charge 810 of composite material on a supporting surface 200. Supporting surface 200 may include an edge 204 that extends between, interconnects, and/or forms an intersection between a first charge-supporting surface 220 of supporting surface 200 and a second charge-supporting surface 230 of supporting surface 200. As also illustrated in FIGS. 3-4, vacuum compaction devices 300 may be configured to be operatively positioned on supporting surface 200 and to extend across first charge-supporting surface 220, second charge-supporting surface 230, and edge 204 to define an enclosed volume 250. Enclosed volume 250 extends, or is defined, between vacuum compaction device 300 and supporting surface 200.

Figure 6:
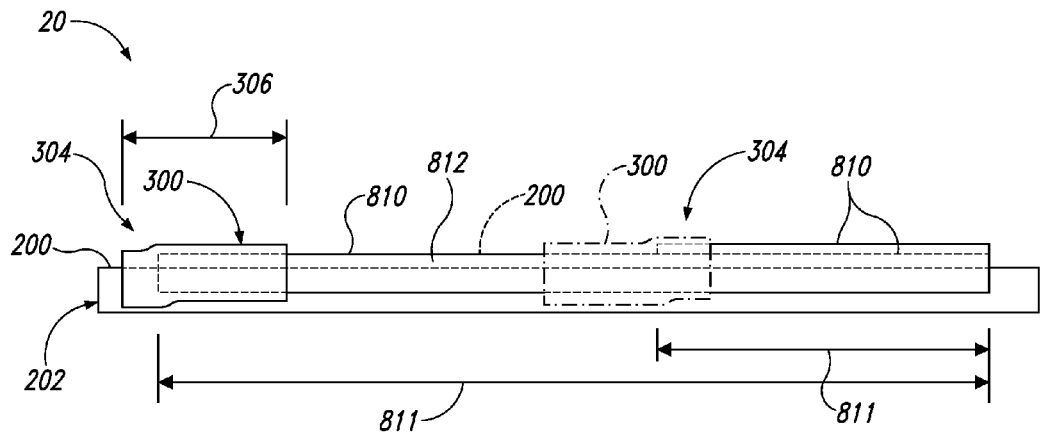
FIG. 6 is a schematic top view of a composite structure fabrication system according to the present disclosure.

Vacuum compaction devices 300 may form a portion of a composite structure fabrication system 20, which further may include a plurality of charges 810 of composite material and supporting surface 200, as illustrated in FIGS. 3-4 and 6. System 20 further may include a layup mandrel 202, and layup mandrel 202 may, at least temporarily, form a portion of supporting surface 200 and/or may support charges 810 of composite material.

During operation of system 20, charge 810 initially may be located, placed, oriented, and/or positioned on supporting surface 200. Subsequently, and as illustrated in FIG. 3, vacuum compaction device 300 may be positioned on supporting surface 200 to define enclosed volume 250, and enclosed volume 250 may include, or contain, at least a portion of charge 810. Stated another way, charge 810 may be positioned, or at least partially positioned, within enclosed volume 250. Device 300 initially may be in undeformed configuration 302.

Then, and as illustrated in FIG. 4, a pressure within enclosed volume 250 may be decreased, thereby creating a pressure differential across vacuum compaction device 300 and/or pressing vacuum compaction device 300 against charge 810. This may compact, or press, charge 810 against supporting surface 200 and/or may deform device 300 from undeformed configuration 302, as illustrated in FIG. 3, to deformed configuration 304, as illustrated in FIG. 4.

As illustrated in FIG. 6, supporting surface 200 may include and/or be an elongate supporting surface, and charges 810 may be oriented to extend along, or along an elongate axis of, supporting surface 200. As also illustrated in FIG. 6, charges 810 may be longer than devices 300. As an example, charges 810 may have, or define, a charge length 811, and devices 300 may have, or define, a device length 306 that is less than charge length 811. As examples, device length 306 may be less than 50 percent, less than 40 percent, less than 30 percent, less than 20 percent, less than 10 percent, less than 8 percent, less than 6 percent, less than 5 percent, less than 4 percent, less than 3 percent, or less than 2 percent of charge length 811.

Under these conditions, and subsequent to charge 810 being placed on supporting surface 200, devices 300 may be repeatedly and/or sequentially positioned along the length of charge 810 to thereby compact an entirety of the length of charge 810. Thus, and as illustrated in solid lines in FIG. 6, devices 300 may be utilized to compact a first portion of charge 810. Additionally or alternatively, and as illustrated in dash-dot lines in FIG. 6, devices 300 may be utilized to compact a second portion of charge 810. This may include operatively positioning devices 300 at a given location along the length of charge 810 such that a previously compacted portion of charge 810 extends at least partially within enclosed volume 250 (as illustrated in FIGS. 3-4), such as to ensure complete compaction of charge 810 along the length thereof.

With this in mind, device 300 also may be referred to herein as a reusable vacuum compaction device 300 that is configured to compact a plurality of charges of composite material and/or to compact a plurality of different portions of a given charge of composite material at a plurality of different locations along the length of supporting surface 200 and/or of charges 810. This may include compaction, or repeated compaction, without damage to device 300.

It is within the scope of the present disclosure that systems 20 may include any suitable number of devices 300. Thus, and in the example of FIG. 6, a single device 300 may be illustrated in solid lines and in dash-dot lines. Under these conditions, two separate, or distinct, portions of charge 810 may be compacted by the single device 300 in a serial, or sequential, fashion. Additionally or alternatively, a first device 300 may be illustrated in solid lines, while a second device 300 may be illustrated in dash-dot lines. Under these conditions, the first device 300 and the second device 300 may be utilized simultaneously and/or concurrently during operation of system 20.

Supporting surface 200 may be defined by any suitable structure. As an example, and as illustrated in FIG. 6, a first, or initial, charge 810 of composite material may be compacted on, or directly on, layup mandrel 202, and layup mandrel 202 may form at least a portion of supporting surface 200. As another example, and as also illustrated in FIG. 6, a second, or subsequent, charge 810 of composite material may be compacted on a previously compacted charge 812 of composite material. Under these conditions, previously compacted charge 812 may form at least a portion of supporting surface 200.

Layup mandrel 202 may include and/or be any suitable structure that may at least temporarily define supporting surface 200 and/or that may support one or more charges 810 of composite material during layup and/or forming thereof. As an example, layup mandrel 202 may include and/or be a forming mandrel that may be utilized to form charges 810, with charges 810 subsequently being moved to a cure mandrel for curing. As another example, layup mandrel 202 may include, be, and/or function as both the layup mandrel and the cure mandrel (i.e., charges 810 may be both laid up on layup mandrel 202 and subsequently cured while being supported by layup mandrel 202).

As further illustrated in FIG. 6, and while not required in all embodiments, device 300 may be configured to compact charge 810 when charge 810 has a stepped, ramped, and/or otherwise nonplanar and/or nonlinear profile and/or device 300 may be configured to compact charge 810 across the stepped, ramped, and/or otherwise nonplanar and/or nonlinear profile. As an example, and as illustrated in solid lines in FIG. 6, a first side of device 300 may contact layup mandrel 202 while a second side of device 300 may contact charge 810 during compaction of charge 810. As another example, and as illustrated in dash-dot lines in FIG. 6, a first side of device 300 may contact previously compacted charge 812, while a second side of device 300 may contact charge 810 during compaction of charge 810.

Returning to FIGS. 3-5, and as illustrated in solid lines, vacuum compaction devices 300 include a compaction force transfer structure 308, a sealing structure 340, and a vacuum distribution manifold 140. Compaction force transfer structure 308 may be configured to transfer and/or convey a compaction force, such as an atmospheric pressure force that may be generated by evacuation of enclosed volume 250, to charge 810 and thereby to compact charge 810. Sealing structure 340 may project from an external periphery 309 of compaction force transfer structure 308 and may be configured to define at least a portion of a periphery of enclosed volume 250. Additionally or alternatively, sealing structure 340 may be configured to form a fluid seal 342 with supporting surface 200, with charge 810, and/or with previously compacted charge 812, such as to form and/or define enclosed volume 250, to fluidly isolate enclosed volume 250 from an ambient environment that surrounds device 300, and/or to permit evacuation of enclosed volume 250. Vacuum distribution manifold 140 may be in fluid communication with enclosed volume 250 and/or may be configured to selectively apply a vacuum to enclosed volume 250, such as to facilitate the evacuation of enclosed volume 250.

As further illustrated in solid lines in FIGS. 3-5, compaction force transfer structure 308 includes a first barrier structure 310, a second barrier structure 320, and a junction support 330. First barrier structure 310 includes a first charge-facing side 312 and a first charge opposed side 314, and first charge-facing side 312 is configured to extend across, or cover, at least a portion of first charge-supporting surface 220 of supporting surface 200. Similarly, second barrier structure 320 includes a second charge-facing side 322 and a second charge-opposed side 324, and second charge-facing side 322 is configured to extend across, or cover, at least a portion of second charge-supporting surface 230 of supporting surface 200.

Junction support 330 extends at least partially between first barrier structure 310 and second barrier structure 320. In addition, junction support 330 is configured to maintain first barrier structure 310 and second barrier structure 320 at an angle 332 with respect to one another. As discussed in more detail herein, junction support 330 also is configured to permit limited angular motion of first barrier structure 310 and second barrier structure 320 relative to one another and/or to permit limited translation of first barrier structure 310 and second barrier structure 320 relative to one another.

It is within the scope of the present disclosure that junction support 330 may extend partially, or only partially, between first barrier structure 310 and second barrier structure 320. As an example, and as perhaps illustrated most clearly in FIG. 7, junction support 330 may extend between a portion of first barrier structure 310 that defines first charge-opposed side 314 and a portion of second barrier structure 320 that defines second charge-opposed side 324. However, junction support 330 may not extend between a portion of first barrier structure 310 that defines first charge-facing side 312 and a portion of second barrier structure 320 that defines second charge-facing side 322. Stated another way, the portion of first barrier structure 310 that defines first charge-facing side 312 may be in contact with, in direct physical contact with, and/or may be defined by the same structure as the portion of second barrier structure 320 that defines second charge-facing side 322.

In such a configuration, first barrier structure 310 and second barrier structure 320 may be formed from a single, continuous piece of material that may be slit, cut, split, and/or otherwise severed along charge-opposed sides 314/324 to permit insertion and/or formation of junction support 330 therein. As an example, and as discussed in more detail herein with reference to FIG. 13, first barrier structure 310 and second barrier structure 320 may be formed from and/or defined by, or by a single, double-walled panel 112 that is cut along one side to permit insertion and/or formation of junction support 330 therein.

Additionally or alternatively, it is also within the scope of the present disclosure that junction support 330 may extend completely, fully, directly, and/or entirely between first barrier structure 310 and second barrier structure 320. As an example, and as perhaps illustrated most clearly in FIG. 8, junction support 330 may extend entirely between and/or operatively couple first barrier structure 310 and second barrier structure 320. Under these conditions, first barrier structure 310 and second barrier structure 320 may be formed and/or defined by separate and/or distinct structures, such as separate and/or distinct double-walled panels 112. Under these conditions, junction support 330 may operatively attach, or may be adhered to, a first edge 311 of first barrier structure 310 and also to a second edge 321 of second barrier structure 320.

Figure 9:
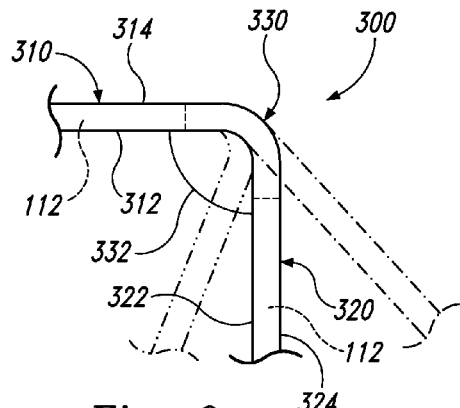
FIG. 9 is a partial cross-sectional view of a vacuum compaction device according to the present disclosure.

Regardless of the exact configuration, and as perhaps best illustrated in FIG. 9, junction support 330 may be configured to maintain first barrier structure 310 and second barrier structure 320 at angle 332, to bias first barrier structure 310 and second barrier structure 320 toward angle 332, and/or to permit limited rotation of first barrier structure 310 and second barrier structure 320 relative to one another. This limited rotation may permit first barrier structure 310 and second barrier structure 320 to operatively contact first charge-supporting surface 220 and second charge-supporting surface 230 of supporting surface 200 regardless of, or despite, angle variations therebetween.

As an example, junction support 330 may be configured to permit angle 332 between first barrier structure 310 and second barrier structure 320 to vary by at least a threshold angle variation. This angle variation is illustrated in dash-dot lines in FIG. 9. Examples of the threshold angle variation include threshold angle variations of at least 5, at least 10, at least 15, at least 20, at least 25, and/or at least 30 degrees. Additionally or alternatively, the threshold angle variation may be less than 90, less than 80, less than 70, less than 60, less than 50, less than 40, and/or less than 30 degrees.

Examples of angle 332 include angles of greater than 0 degrees, at least 20 degrees, at least 30 degrees, at least 45 degrees, at least 60 degrees, and/or at least 75 degrees. Additionally or alternatively, angle 332 also may be less than 180 degrees, less than 160 degrees, less than 150 degrees, less than 135 degrees, less than 120 degrees, and/or less than 105 degrees. Angle 332 also may be 90 degrees, approximately 90 degrees, an acute angle, and/or an obtuse angle.

Figure 10:
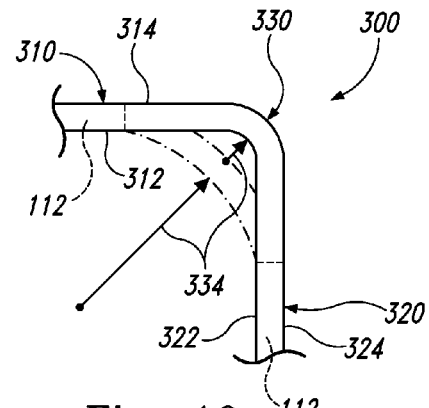
FIG. 10 is a partial cross-sectional view of a vacuum compaction device according to the present disclosure.

As perhaps best illustrated in FIG. 10, junction support 330 further may be configured to permit limited translation of first barrier structure 310 and second barrier structure 320 relative to one another. This limited translation may be accommodated by stretching and/or deformation of junction support 330 and may permit vacuum compaction devices 300 that include junction support 330 to have, exhibit, and/or define a range of different radius of curvature 334 within a region of compaction force transfer structure 308 that covers and/or contacts edge 204 of supporting surface 200 (i.e., within a region of compaction force transfer structure 308 that is defined by junction support 330). This radius of curvature variation is illustrated in dash-dot lines in FIG. 10, and junction support 330 may be referred to herein as having and/or exhibiting at least a threshold range of radii of curvature between first barrier structure 310 and second barrier structure 320. Additionally or alternatively, junction support 330 also may be referred to herein as being configured to conform to at least the threshold range of radii of curvature for a portion of charge 810 that extends around edge 204 of supporting surface 200 (and thereby contacts junction support 330), as illustrated in FIGS. 3-4.

The illustrated variation in radius of curvature 334 may permit vacuum compaction devices 300 that include junction support 330 to operatively contact, or uniformly compact, charges 810 of composite material that exhibit a different and/or varying radius of curvature along an outer surface thereof. As an example, and as a number of charges 810 that are being compacted increases, the radius of curvature 206 of edge 204 of supporting surface 200 correspondingly will increase, and vacuum compaction devices 300 disclosed herein may be configured to accommodate this change in radius of curvature 206 (as illustrated in FIGS. 3-4).

The threshold range of radii of curvature may be bounded by a minimum radius of curvature and a maximum radius of curvature. Examples of the maximum radius of curvature include radii of curvature that are at least 1.5, at least 2, at least 2.5, at least 3, at least 3.5, at least 4, at least 5, at least 6, at least 8, or at least 10 times the minimum radius of curvature.

Figure 7:
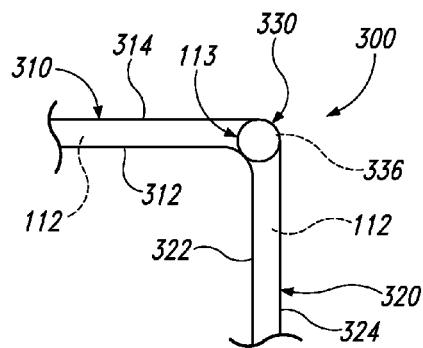
FIG. 7 is a partial cross-sectional view of a vacuum compaction device according to the present disclosure.

It is within the scope of the present disclosure that junction support 330 may include and/or be formed from any suitable junction support material and/or materials. As an example, junction support 330 may include and/or be a rigid, or at least substantially rigid, junction support body. As a more specific example, and as illustrated in FIG. 7, junction support 330 may include and/or be a polymeric tube 336, which may be inserted longitudinally into a slot 113 that may be formed by cutting double-walled panel 112 to separate first charge-opposed side 314 from second charge-opposed side 324.

Figure 8:
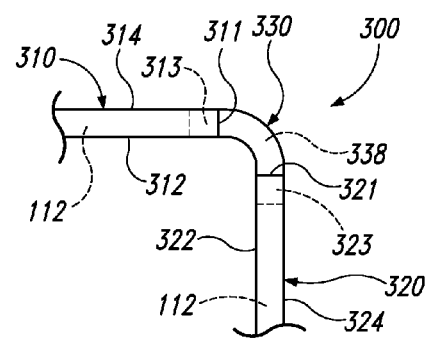
FIG. 8 is a partial cross-sectional view of a vacuum compaction device according to the present disclosure.

As another example, and as illustrated in FIG. 8, junction support 330 additionally or alternatively may include and/or be formed from an elastomeric material 338. Under these conditions, elastomeric material 338 may interconnect and/or adhere first barrier structure 310 to second barrier structure 320. Additionally or alternatively, elastomeric material 338 may be adhered to first barrier structure 310 and also to second barrier structure 320 and/or may indirectly adhere first barrier structure 310 to second barrier structure 320. As illustrated in dashed lines in FIG. 8, elastomeric material 338 may extend within a first junction recess 313, which may be at least partially defined by first barrier structure 310, and/or within a second junction recess 323, which may be at least partially defined by second barrier structure 320. Such a configuration may increase a surface area for contact between elastomeric material 338 and first barrier structure 310 and/or second barrier structure 320, thereby increasing a durability of vacuum compaction device 300.

Elastomeric material 338 may be molded, molded in place, cured, and/or cured in place to form and/or define junction support 330. Examples of the elastomeric material 338 include a polymeric material, a latex, and/or a urethane.

Junction support material may have one or more desired, target, and/or preselected properties. As examples, the junction support material may not adhere to supporting surface 200 and/or to charge 810. As additional examples, the junction support material may not chemically react with supporting surface 200 and/or with charge 810. As still further examples, the junction support material may not transfer a contaminant to supporting surface 200 and/or to charge 810. The junction support material also may be referred to herein as a junction material.

Returning to FIGS. 3-5, sealing structure 340 may include any suitable structure that may project from external periphery 309 of compaction force transfer structure 308 and/or that may be configured to define at least the portion of the periphery of enclosed volume 250 when vacuum compaction device 300 is operatively positioned on supporting surface 200. As an example, sealing structure 340 may include and/or be a lip seal 344 that extends from external periphery 309 and/or that extends in a direction that is parallel, or at least substantially parallel, to a plane that is defined by first charge-facing side 312 and/or by second charge-facing side 322. As another example, sealing structure 340 additionally or alternatively may include and/or be a tapered sealing structure that tapers away from compaction force transfer structure 308.

Figure 11:
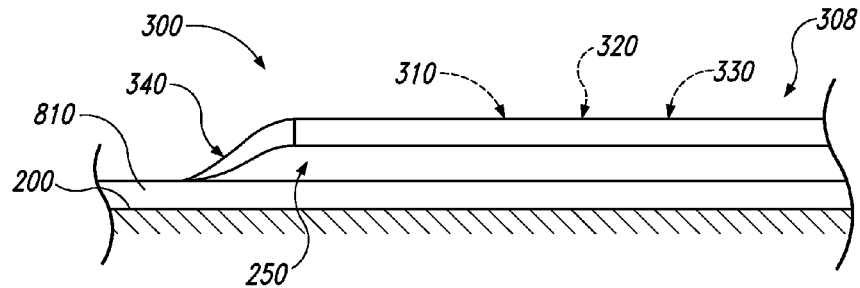
FIG. 11 is a partial cross-sectional view of a vacuum compaction device, according to the present disclosure, in an undeformed configuration.
Figure 12:
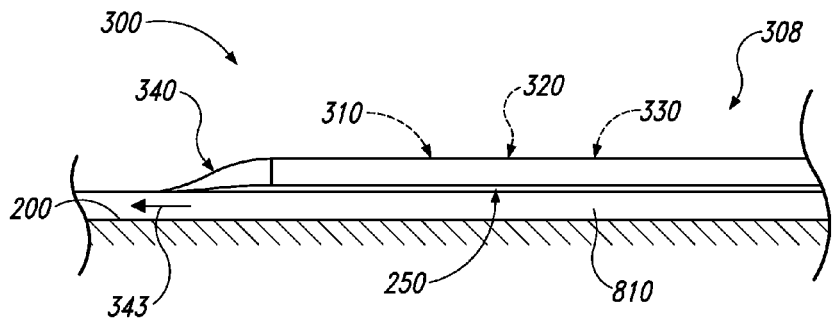
FIG. 12 is a partial cross-sectional view of the vacuum compaction device of FIG. 11 in a deformed configuration.

Regardless of the exact configuration, sealing structure 340 may be configured to stretch, pull, extend, and/or otherwise tension charge 810 upon application of the vacuum to enclosed volume 250. This tensioning may decrease a potential for wrinkling and/or buckling of charge 810 upon compaction thereof and is illustrated in FIGS. 11-12. As illustrated in FIG. 11, and subsequent to initial contact between vacuum compaction device 300 and charge 810 but prior to application of the vacuum to enclosed volume 250, sealing structure 340 may extend proximal and/or in contact with charge 810. Subsequently, and as illustrated in FIG. 12, the vacuum may be applied to enclosed volume 250. Application of the vacuum may press compaction force transfer structure 308 against charge 810, thereby compacting charge 810. In addition, application of the vacuum also may cause sealing structure 340 to apply a tensioning force 343 to charge 810, thereby placing the portion of charge 810 that extends within enclosed volume 250 and/or is compacted by vacuum compaction device 300 in tension. Tensioning force 343 may be generated by compression of sealing structure 340 and/or by deformation of sealing structure 340 during application of the vacuum, and a magnitude of the tensioning force may be controlled and/or regulated by a changing a shape of sealing structure 340.

It is within the scope of the present disclosure that sealing structure 340 may be operatively attached to external periphery 309 and that this operative attachment may be accomplished in any suitable manner. As an example, sealing structure 340 may be adhered to compaction force transfer structure 308 and/or to external periphery 309 thereof. As another example, and as illustrated in FIGS. 3-4, sealing structure 340 may extend at least partially within a first peripheral recess 316, which is at least partially defined by first barrier structure 310, and/or within a second peripheral recess 326, which is at least partially defined by second barrier structure 320. Such a configuration may increase a durability of sealing structure 340, may retain sealing structure 340 in operative engagement with compaction force transfer structure 308, and/or may increase a contact area for adhesion between sealing structure 340 and compaction force transfer structure 308. Sealing structure 340 may include and/or be a cast sealing structure that may be cast and/or cured around external periphery 309 of compaction force transfer structure 308.

As illustrated, sealing structure 340 may not extend between first charge-facing side 312 and supporting surface 200 and/or may not extend between second charge-facing side 322 and supporting surface 200. Additionally or alternatively, sealing structure 340 may not be a compression seal that is configured to form fluid seal 342 via compression of sealing structure 340. However, this is not required.

Sealing structure 340 may include and/or be formed from any suitable sealing material, which also may be referred to herein as a sealing structure material. The sealing material may have one or more desired, target, and/or preselected properties. As examples, the sealing material may not adhere to supporting surface 200 and/or to charge 810. As additional examples, the sealing material may not chemically react with supporting surface 200 and/or with charge 810. As still further examples, the sealing material may not transfer a contaminant to supporting surface 200 and/or to charge 810. Examples of the sealing material include any suitable resilient material, elastomeric material, polymeric material, latex, and/or urethane. Sealing structure 340 may include, or be formed from, the same material as junction support 330 (i.e., the junction support material).

First barrier structure 310 and second barrier structure 320 collectively may be referred to herein as barrier structures 310/320. Barrier structures 310/320 may include any suitable structure that may include and/or define respective charge-facing sides 312/322 and charge-opposed sides 314/324. As an example, and as perhaps best illustrated in FIG. 5, barrier structures 310/320 may include and/or be planar and/or elongate barrier structures 310/320. As an example, a planar and/or an elongate first barrier structure 310 may include, have, and/or define a first length 317 and a first width 318, each of which may be measured along first charge-opposed side 314 (as illustrated in FIG. 5). First barrier structure 310 also may include, have, and/or define a first thickness 319, which may be measured between first charge-opposed side 314 and first charge-facing side 312 (as illustrated in FIG. 3). Similarly, second barrier structure 320 may include, have, and/or define a second length 327 and a second width 328, each of which may be measured along second charge-opposed side 324 (as illustrated in FIG. 5). Second barrier structure 320 also may include, have, and/or define a second thickness 329, which may be measured between second charge-opposed side 324 and second charge-facing side 322 (as illustrated in FIG. 3).

First length 317 may be equal to or greater than first width 318. Similarly, second length 327 may be equal to or greater than second width 328. As examples, a ratio of first length 317 to first width 318 and/or a ratio of second length 327 to second width 328 may be at least 1, at least 2, at least 3, at least 4, at least 5, at least 6, at least 7, at least 8, at least 9, and/or at least 10. First length 317 may be equal, or at least substantially equal, to second length 327. Additionally or alternatively, first width 318 may be equal, or at least substantially equal, to second width 328. However, this is not required.

First width 318 may be greater than first thickness 319. Similarly, second width 328 may be greater than second thickness 329. As examples, a ratio of first width 318 to first thickness 319 and/or a ratio of second width 328 to second thickness 329 may be at least 5, at least 10, at least 15, at least 20, at least 25, and/or at least 30.

As illustrated in FIG. 5, junction support 330 may extend along, or at least substantially along, first length 317 of first barrier structure 310 and/or along, or at least substantially along, second length 327 of second barrier structure 320. This may include extending along a portion, a substantial portion, or even an entirety of first length 317 and/or second length 327.

First length 317 and second length 327 may have, or define, any suitable value. As examples, first length 317 and/or second length 327 may be at least 0.5 meter (m), at least 0.75 m, at least 1 m, at least 1.25 m, at least 1.5 m, at least 1.75 m, at least 2 m, at least 2.25 m, and/or at least 2.5 m. Additionally or alternatively, first length 317 and/or second length 327 also may be less than 5 m, less than 4.5 m, less than 4 m, less than 3.5 m, less than 3 m, less than 2.5 m, less than 2.25 m, less than 2 m, less than 1.75 m, less than 1.5 m, less than 1.25 m, or less than 1 m.

As discussed, barrier structures 310/320 may include and/or be planar, or at least substantially planar, barrier structures 310. As such, first barrier structure 310 also may be referred to herein as a planar, or at least substantially planar, first barrier structure 310. Similarly, second barrier structure 320 also may be referred to herein as a planar, or at least substantially planar, second barrier structure 320.

Barrier structures 310/320 generally may be rigid but may have some flexibility, such as to permit barrier structures 310/320 to conform to the shape of supporting surface 200 and/or to permit barrier structures 310/320 to reversibly transition between undeformed configuration 302 of FIG. 3 and deformed configuration 304 of FIG. 4. As examples, barrier structures 310/320 may be formed from and/or may include a flexible material, a resilient material, an incompressible material, an at least substantially incompressible material, an inelastic material, a non-elastomeric material, a semi-stiff material, a semi-compliant material, and/or a semi-rigid material.

As more specific examples, barrier structures 310/320 may be formed from a polymeric material and/or from a polycarbonate. As another more specific example, barrier structures 310/320 may be formed from a barrier structure material that has a Young's modulus of at least 1 gigapascal (GPa), at least 1.25 GPa, at least 1.5 GPa, at least 1.75 GPa, at least 2 GPa, at least 2.25 GPa, and/or at least 2.5 GPa. Additionally or alternatively, the Young's modulus of the barrier structure material may be less than 4 GPa, less than 3.75 GPa, less than 3.5 GPa, less than 3.25 GPa, less than 3 GPa, less than 2.75 GPa, less than 2.5 GPa, less than 2.25 GPa, and/or less than 2 GPa.

As illustrated in FIGS. 3-4, first charge-facing side 312 of first barrier structure 310 and/or second charge-facing side 322 of second barrier structure 320 may include and/or define a plurality of evacuation conduits 122. Evacuation conduits 122 may be adapted, configured, shaped, and/or constructed to provide fluid communication between enclosed volume 250 and vacuum distribution manifold 140. Thus, evacuation conduits 122 may permit, or facilitate, application of the vacuum to enclosed volume 250.

Figure 13:
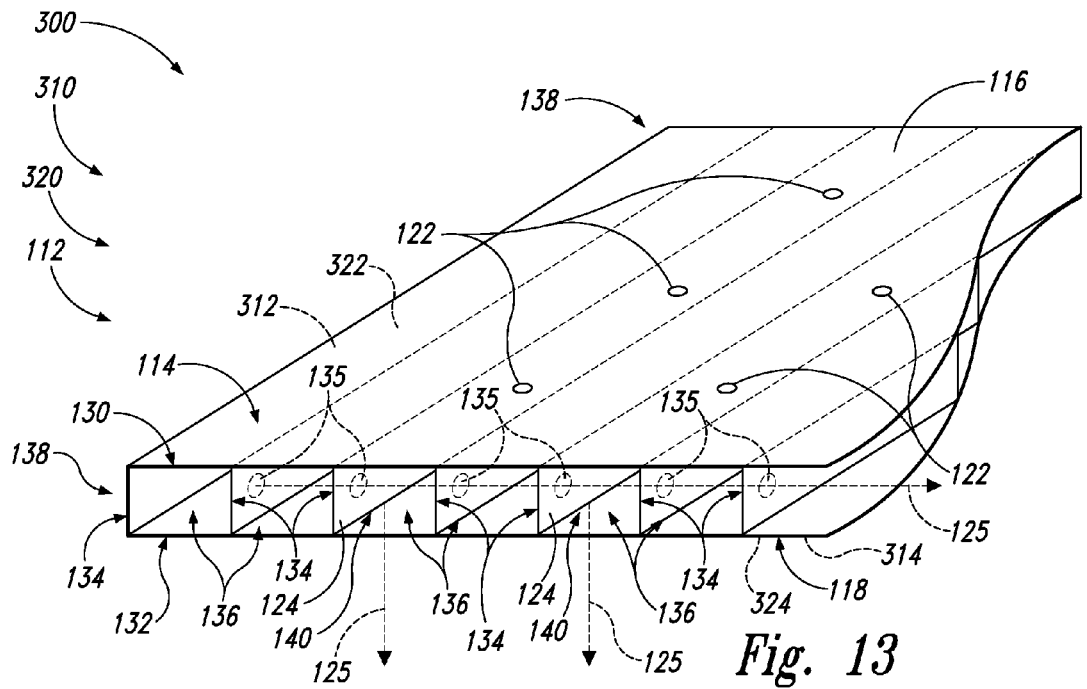
FIG. 13 is a schematic fragmentary view of a barrier structure that may be utilized with the systems and methods according to the present disclosure.

As discussed, barrier structures 310/320 may include and/or be defined by respective double-walled panels 112, and FIG. 13 provides less schematic examples of barrier structures 310/320, according to the present disclosure, in the form of double-walled panels 112. Barrier structures 310/320 of FIG. 13 include a first planar wall 130, a second, opposed planar wall 132, and a plurality of elongate webs 134 that extends between first planar wall 130 and second planar wall 132. First planar wall 130 also may be referred to herein as a charge-facing planar wall 130, and second planar wall 132 also may be referred to herein as a charge-opposed planar wall 132. Double-walled panel 112 also may be referred to herein as a panel 112.

Planar walls 130 and 132, together with elongate webs 134, define a plurality of elongate channels 136 that extend within barrier structures 310/320. Elongate channels 136 also may be referred to herein as channels 136, and it is within the scope of the present disclosure that channels 136 may extend along a longitudinal axis that is parallel to first planar wall 130 and/or second planar wall 132, may extend from an edge 138 of barrier structures 310/320, may extend from a first edge 138 of barrier structures 310/320 to a second edge 138 of barrier structures 310/320, and/or may extend between two opposed edges 138 of barrier structures 310/320. As illustrated in dashed lines in FIG. 13, one or more elongate webs 134 may have openings 135 defined therein, and openings 135 may provide fluid communication between adjacent elongate channels 136 that may be separated by an elongate web 134 that includes an opening 135. Openings 135 may be created by forming a hole and/or an orifice within elongate webs 134, such as by drilling and/or laser drilling elongate webs 134.

First planar wall 130 may define first side 114 of barrier structures 310/320, and second planar wall 132 may define second side 118 of barrier structures 310/320. First side 114 may include and/or be a respective charge-facing side 312/322, of barrier structures 310/320. In addition, first planar wall 130 also may define at least a portion of evacuation conduits 122, as shown. Similarly, second side 118 may include and/or be a respective charge-opposed side 314/324 of barrier structures 310/320.

Evacuation conduits 122 may be in fluid communication with one or more selected elongate channels 136, which also may be referred to herein as evacuation channels 124 and may form a portion of vacuum distribution manifold 140. Thus, and as illustrated by dashed arrows at 125, a vacuum source may selectively evacuate (or provide the vacuum to) evacuation channels 124. This vacuum may be applied along one or more selected evacuation channels, such as from an end thereof, and/or may be applied via openings 135, as illustrated.

When barrier structures 310/320 of FIG. 13 forms a portion of vacuum compaction device 300 and is positioned on supporting surface 200, this vacuum may be utilized to decrease the pressure within enclosed volume 250, as discussed herein. When barrier structures 310/320 include double-walled panels 112, edges 138 (as illustrated in FIG. 13) may form at least a portion of external periphery 309 (as illustrated in FIGS. 3-5). Under these conditions, sealing structure 340 may fluidly seal elongate channels 136 at edge 138.

It is within the scope of the present disclosure that first charge-facing side 312 of first barrier structure 310 and/or second charge-facing side 322 of second barrier structure 320 may include and/or be defined by a release surface 116. Release surface 116 may include and/or be formed from a material that is selected to not adhere to charge 810, from a material that is selected to not react with charge 810, from a material that is selected not to damage charge 810, and/or from a material that is selected not to contaminate charge 810. As an example, release surface 116 may include and/or be formed from a fluoropolymer.

Returning to FIGS. 3-5, vacuum distribution manifold 140 may include any suitable structure that may be in fluid communication with enclosed volume 250 and/or that may be configured to selectively apply the vacuum to enclosed volume 250. In addition, vacuum distribution manifold 140 may be defined by any suitable structure. As an example, vacuum distribution manifold 140 may be operatively attached to first barrier structure 310 and/or to second barrier structure 320 and/or may be at least partially defined by another structure, such as a handle 370, that may be operatively attached to first barrier structure 310 and/or to second barrier structure 320. As another example, and as discussed, vacuum distribution manifold 140 may be defined, at least in part, by first barrier structure 310 and/or by second barrier structure 320. As a more specific example, and as discussed, barrier structures 310/320 may include double-walled panels 112, which may define at least a portion of vacuum distribution manifold 140.

As illustrated in dashed lines in FIGS. 3-5, vacuum compaction device 300 may include one or more vacuum conduits 352. Vacuum conduits 352 may extend between first barrier structure 310 and second barrier structure 320 and/or may be configured to convey and/or apply the vacuum between a portion of vacuum distribution manifold 140 that is defined by first barrier structure 310 and a portion of vacuum distribution manifold 140 that is defined by second barrier structure 320. As illustrated, vacuum conduits 352 may extend within, or at least partially within, junction support 330 and/or within, or at least partially within, first barrier structure 310 and/or second barrier structure 320, such as via openings 135 of FIG. 13. Additionally or alternatively, and as also illustrated, vacuum conduits may be external to junction support 330 and/or may extend between first charge-opposed side 314 and second charge-opposed side 324.

Vacuum distribution manifold 140 further may include a fluid exhaust port 372. Fluid exhaust port 372 may be configured to permit a fluid to exit vacuum distribution manifold 140, such as to permit application of the vacuum by vacuum distribution manifold 140.

As also illustrated in dashed lines in FIGS. 3-5, vacuum compaction device 300 further may include a pressure transducer 146. Pressure transducer 146 may include and/or be a pressure detector and/or a pressure gauge. The pressure detector may be configured to detect the pressure within vacuum distribution manifold 140. Similarly, the pressure gauge may be configured to indicate, or display, the pressure within vacuum distribution manifold 140.

As also illustrated in dashed lines in FIGS. 3-5, vacuum compaction device 300 further may include and/or be in fluid communication with a vacuum source 150. Vacuum source 150 may be configured to selectively generate the vacuum and/or to selectively apply the vacuum to vacuum distribution manifold 140. Vacuum source 150 may include and/or be any suitable structure. As examples, vacuum source 150 may include and/or be a pneumatically powered vacuum source, a venturi, and/or a tunable vacuum source configured to permit an operator to select a magnitude of the vacuum. As illustrated, vacuum source 150 may include a fluid inlet 382 configured to provide a fluid to vacuum source 150, such as to provide a motive force for generation of the vacuum. In addition, fluid exhaust port 372 may include and/or be an exhaust from vacuum source 150.

It is within the scope of the present disclosure that, when vacuum compaction device 300 is operatively positioned on supporting surface 200 and vacuum source 150 is applying the vacuum to enclosed volume 250, such as via vacuum distribution manifold 140, vacuum compaction device 300 may be configured to generate at least a threshold vacuum level within enclosed volume 250. This threshold vacuum level may be measured relative to atmospheric pressure (i.e., as a difference between atmospheric pressure and the pressure within enclosed volume 250) and may be significantly greater than a vacuum level that may be produced and/or generated utilizing vacuum bagging techniques.

The larger magnitude of the threshold vacuum may be due to a number of factors, including less fluid leakage into enclosed volume 250 that is defined by vacuum compaction device 300 and/or better vacuum distribution within enclosed volume 250 that is defined by vacuum compaction device 300 when compared to systems and methods that utilize vacuum bagging. In addition, the larger magnitude of the threshold vacuum may permit systems and methods that utilize vacuum compaction device 300 to more fully compact charges 810 and/or to compact charges 810 more quickly than may be accomplished utilizing vacuum bagging. Examples of the threshold vacuum level include threshold vacuum levels of at least 30 kilopascals (kPa), at least 40 kPa, at least 50 kPa, at least 60 kPa, at least 70 kPa, at least 80 kPa, and/or at least 90 kPa.

Figure 14:
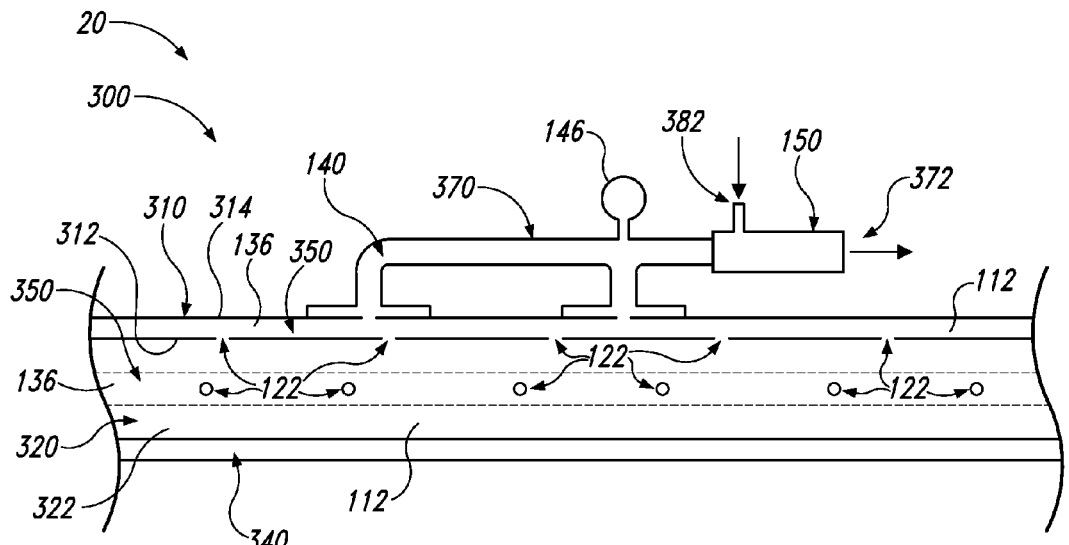
FIG. 14 is a more detailed partial schematic side view of a vacuum compaction device according to the present disclosure.

As illustrated in dashed lines in FIGS. 3-5 and perhaps illustrated most clearly in FIG. 14, vacuum compaction device 300 further may include handle 370. Handle 370 may be operatively attached to any suitable portion of vacuum compaction device 300, such as to first barrier structure 310 and/or second barrier structure 320 thereof, and may be configured to facilitate operation of vacuum compaction device 300 by an operator, or even by a single operator. As illustrated, handle 370 may form and/or define at least a portion of vacuum distribution manifold 140 and/or may provide fluid communication between vacuum source 150 and a portion of vacuum distribution manifold 140 that is defined by barrier structures 310/320. As also illustrated, pressure transducer 146 and/or vacuum source 150 may be operatively attached to handle 370, may be integrated into handle 370, and/or may be in fluid communication with vacuum distribution manifold 140 via handle 370. As further illustrated, fluid exhaust port 372 may be at least partially defined by handle 370 and/or may be an exhaust of vacuum source 150.

As discussed, vacuum compaction device 300 may include and/or define undeformed configuration 302, as illustrated at least in FIG. 3, and deformed configuration 304, as illustrated at least in FIG. 4. Vacuum compaction device 300 may have, or define, undeformed configuration 302 when not operatively positioned on supporting surface 200 and/or when operatively positioned on supporting surface 200 and when the vacuum is not applied to enclosed volume 250. Conversely, vacuum compaction device 300 may have, or define, deformed configuration 304 when operatively positioned on supporting surface 200 and when the vacuum is applied to enclosed volume 250.

As illustrated in FIG. 3, when vacuum compaction device 300 is in undeformed configuration 302, first barrier structure 310 and/or second barrier structure 320 may be planar, may be at least substantially planar, may not be conformed to a surface contour of supporting surface 200, may not be entirely conformed to the surface contour of supporting surface 200, and/or may not be conformed, bent, and/or deformed around a terminal region 813 of charge 810. Conversely, and as illustrated in FIG. 4, when vacuum compaction device 300 is in deformed configuration 304, first barrier structure 310 and/or second barrier structure 320 may be nonplanar, may be at least partially conformed to the surface contour supporting surface 200, and/or may be conformed, bent, and/or deformed around, or at least partially around, terminal region 813 of charge 810. Stated another way, and when vacuum compaction device 300 is in deformed configuration 304, a contour of at least a portion of compaction force transfer structure 308, such as of first barrier structure 310 and/or second barrier structure 320, may correspond, at least partially, to the surface contour of supporting surface 300. Examples of the surface contour of supporting surface 200 include a non-planar surface contour, a concave surface contour, a convex surface contour, an arcuate surface contour, and/or an angular surface contour.

Enclosed volume 250 may include any suitable volume that includes at least a portion of charge 810 and/or that is at least partially, or even completely, enclosed, surrounded, defined, and/or bounded by supporting surface 200, charge 810, and/or vacuum compaction device 300. As such, at least a portion of enclosed volume 250 may be bounded by compaction force transfer structure 308, by first barrier structure 310, by second barrier structure 320, by junction support 330, and/or by sealing structure 340.

Charge 810 may be formed from and/or include any suitable composite material. As an example, charge 810 may include a pre-impregnated composite material. As another example, charge 810 may include a plurality of fibers and/or a resin material. Examples of fibers include carbon fibers, polymeric fibers, metallic fibers, and/or glass fibers. Examples of resin materials include epoxy, adhesive, and/or polymeric resin. As additional examples, charge 810 may include a metallic ply, a metallic film, a metallic layer, and/or any suitable combination of the above materials.

Charge 810 may include one or more plies, or layers, of composite material. As examples, charge 810 may include 1, or at least 1, ply of composite material. Additionally or alternatively, charge 810 may include at least 2, at least 3, at least 4, at least 5, at least 10, at least 15, or at least 20 stacked plies of composite material. Charge 810 also may include fewer than 80, fewer than 70, fewer than 60, fewer than 50, fewer than 45, fewer than 40, fewer than 35, fewer than 30, fewer than 25, fewer than 20, fewer than 15, or fewer than 10 stacked plies of composite material.

Figure 15:
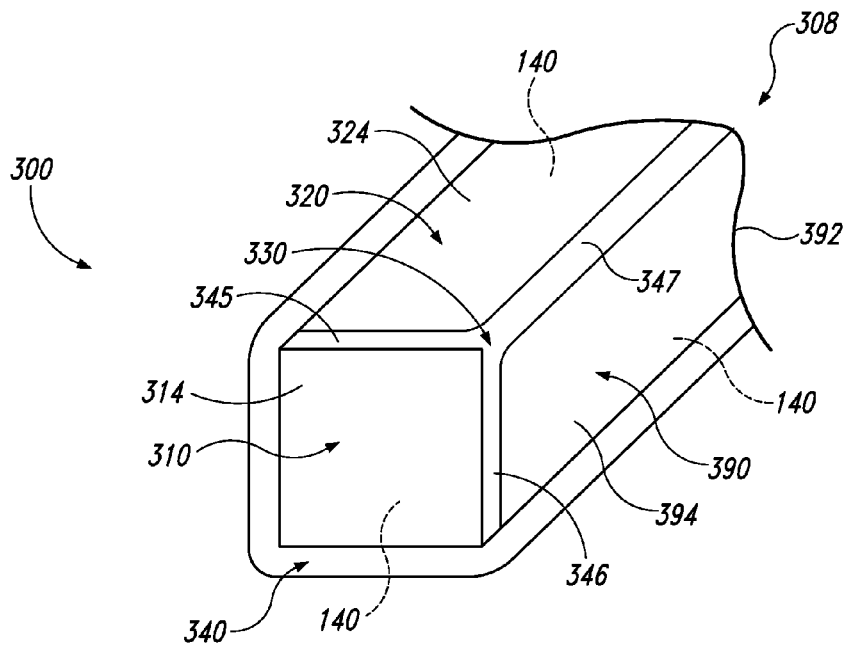
FIG. 15 is a partial profile view of a vacuum compaction device according to the present disclosure.

FIG. 15 is a partial profile view of a vacuum compaction device 300 according to the present disclosure. Vacuum compaction device 300 of FIG. 15 may be similar to vacuum compaction devices 300 of FIGS. 3-14, and any of the structures, functions, and/or features that are discussed herein with reference to vacuum compaction device 300 of FIG. 15 may be included in and/or utilized with vacuum compaction devices 300 of FIGS. 3-14 without departing from the scope of the present disclosure. Similarly, any of the structures, functions, and/or features that are discussed herein with reference to vacuum compaction devices 300 of FIGS. 3-14 may be included in and/or utilized with vacuum compaction device 300 of FIG. 15 without departing from the scope of the present disclosure.

Similar to vacuum compaction devices 300 of FIGS. 3-14, vacuum compaction device 300 of FIG. 15 includes a compaction force transfer structure 308, a sealing structure 340, and a vacuum distribution manifold 140. Also similar to vacuum compaction devices 300 of FIGS. 3-14, compaction force transfer structure 308 of FIG. 15 includes a first barrier structure 310, a second barrier structure 320, and a junction support 330. However, compaction force transfer structure 308 of FIG. 15 further includes a third barrier structure 390 that includes a third charge-facing side 392 and a third charge-opposed side 394. In addition, junction support 330 of FIG. 15 is configured to extend at least partially between first barrier structure 310 and second barrier structure 320, between second barrier structure 320 and third barrier structure 390, and also between first barrier structure 310 and third barrier structure 390.

More specifically, junction support 330 includes a first junction support 345, which extends at least partially between first barrier structure 310 and second barrier structure 320. Junction support 330 also includes a second junction support 346, which extends at least partially between first barrier structure 310 and third barrier structure 390. Junction support 330 further includes a third junction support 347, which extends at least partially between second barrier structure 320 and third barrier structure 390.

Vacuum compaction device 300 of FIG. 15 may be configured to compact a charge of composite material to a corner. As an example, supporting surface 200 of FIGS. 3-4 may include a plurality of edges 204 that meet at the corner, and vacuum compaction device 300 of FIG. 15 may be configured to be operatively positioned at the corner such that vacuum compaction device 300 covers the corner and at least a portion of each of the plurality of edges 204, thereby facilitating compaction of the charge of composite material about the corner.

Figure 16:
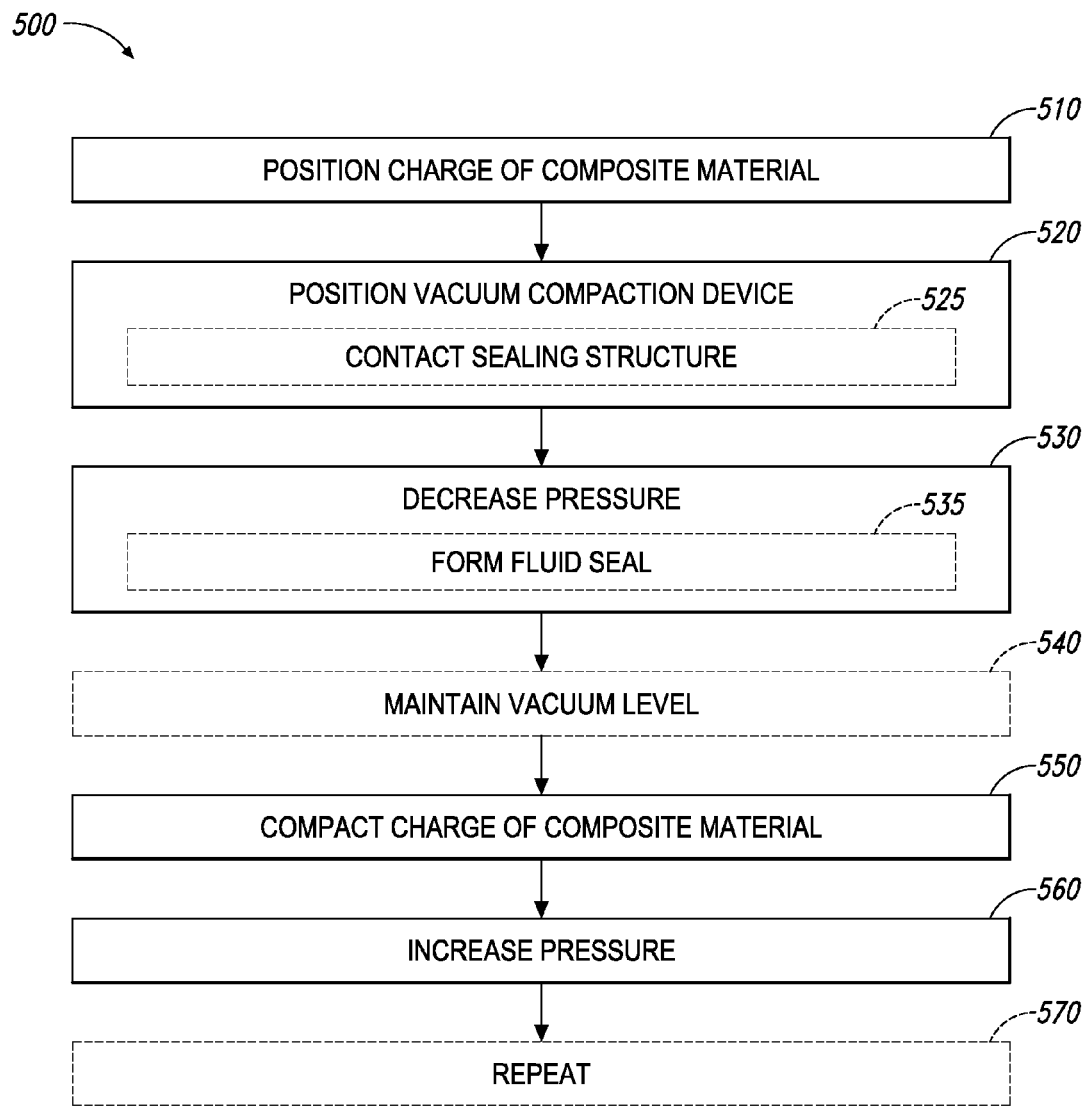
FIG. 16 is a flowchart depicting methods, according to the present disclosure, of compacting a charge of composite material on a supporting surface.

FIG. 16 is a flowchart depicting methods 500, according to the present disclosure, of compacting a charge of composite material on a supporting surface. Methods 500 include positioning the charge of composite material at 510, positioning a vacuum compaction device at 520, and decreasing a pressure at 530. Methods 500 further may include maintaining a vacuum level at 540 and include compacting the charge of composite material at 550 and increasing the pressure at 560. Methods 500 also may include repeating at least a portion of the methods at 570.

Positioning the charge of composite material at 510 may include positioning the charge of composite material on the supporting surface. As discussed herein, the supporting surface may be any suitable surface, such as supporting surface 200 of FIGS. 3-4, that may directly and/or indirectly support the charge of composite material. As examples, the supporting surface may include, be, or be defined by a layup mandrel and/or by a previously compacted charge of composite material.

The positioning at 510 may include positioning any suitable number of charges of composite material in sequential and/or parallel fashions. As an example, the charge of composite material may be a first charge of composite material, and the positioning at 510 may include positioning a second charge of composite material, a subsequent charge of composite material, and/or a plurality of charges of composite material. Under these conditions, the positioning at 520 may include positioning the vacuum compaction device such that an enclosed volume, which is at least partially defined thereby, includes and/or contains at least a portion of, or of each of, the plurality of charges of composite material. In addition, the compacting at 550 may include simultaneously and/or concurrently compacting the plurality of charges of composite material.

Positioning the vacuum compaction device at 520 may include positioning the vacuum compaction device on the supporting surface to at least partially define the enclosed volume. As discussed herein, the enclosed volume includes and/or contains at least a portion of the charge of composite material and/or may be defined, at least in part, by the vacuum compaction device and also by the supporting surface.

As also discussed in more detail herein with reference to vacuum compaction device 300 of FIGS. 3-15, the vacuum compaction device includes a force transfer structure that includes a first barrier structure, a second barrier structure, and a junction support, which extends at least partially between the first barrier structure and the second barrier structure. The positioning at 520 further includes extending the vacuum compaction device across, about, and/or around an edge of the supporting surface that extends between a first charge-supporting surface of the supporting surface and a second charge-supporting surface of the supporting surface. The positioning at 520 also includes positioning such that the first barrier structure extends across, or across at least a portion of, the first charge-supporting surface, such that the second barrier structure extends across, or across at least a portion of, the second charge-supporting surface, and such that the junction support extends along, or at least partially along, the edge.

The vacuum compaction device may include a sealing structure, such as sealing structure 340 of FIGS. 3-5, 11-12, and 15, and the sealing structure may extend around an external periphery of the compaction force transfer structure. Under these conditions, the positioning at 520 further may include contacting the sealing structure with, or at least partially with, the supporting surface, contacting the sealing structure with, or at least partially with, the layup mandrel, and/or contacting the sealing structure with, or at least partially with, the previously compacted charge of composite material, as indicated at 525.

The positioning at 520 may be accomplished in any suitable manner. As examples, the positioning at 520 may include manually positioning, such as by an operator, mechanically assisted positioning, such as when one or more mechanical devices assists the operator with alignment and/or positioning of the vacuum compaction device, and/or automated positioning, such as when the positioning is performed automatically and/or by a robot.

Decreasing the pressure at 530 may include decreasing the pressure within the enclosed volume to transition the vacuum compaction device from an undeformed configuration to a deformed configuration, which is different from the undeformed configuration. Additionally or alternatively, the decreasing at 530 also may include forming a fluid seal between the supporting surface and the compaction force transfer structure with, or via, the sealing structure, as indicated at 535.

Maintaining the vacuum level at 540 may include maintaining at least a threshold vacuum level within the enclosed volume for at least a threshold compaction time. The maintaining at 540 further may include measuring and/or determining the vacuum level, such as via and/or utilizing any suitable pressure transducer, pressure detector, and/or pressure gauge. The maintaining at 540 may be performed subsequent to the decreasing at 530, at least partially concurrently with the compacting at 550, and/or prior to the increasing at 560. Examples of the threshold vacuum level include threshold vacuum levels of at least 30 kPa, at least 40 kPa, at least 50 kPa, at least 60 kPa, at least 70 kPa, at least 80 kPa, and/or at least 90 kPa.

Examples of the threshold compaction time include threshold compaction times of at least 1 second, at least 2 seconds, at least 3 seconds, at least 4 seconds, at least 5 seconds, at least 10 seconds, at least 15 seconds, at least 20 seconds, at least 30 seconds, at least 45 seconds, and/or at least 60 seconds. Additionally or alternatively, the threshold compaction time also may be less than 90 seconds, less than 75 seconds, less than 60 seconds, less than 45 seconds, less than 30 seconds, less than 15 seconds, less than 10 seconds, less than 8 seconds, less than 6 seconds, and/or less than 5 seconds.

Compacting the charge of composite material at 550 may include compacting the charge of composite material between the vacuum compaction device and the supporting surface and may be responsive to the decreasing at 530. The compacting at 550 further may include debulking the charge of composite material, compressing the charge of composite material, decreasing a thickness of the charge of composite material, and/or increasing an adhesion between the charge of composite material and a previously compacted charge of composite material. It is within the scope of the present disclosure that the compacting at 550, or even an entirety of methods 500, may be performed without vacuum bagging the charge of composite material. Additionally or alternatively, the compacting at 550, or even an entirety of methods 500, may be performed without forming an adhesive bond between the vacuum compaction device and the supporting surface.

Increasing the pressure at 560 may include increasing the pressure within the enclosed volume to return the vacuum compaction device to the undeformed configuration. The increasing at 560 may be performed subsequent to the compacting at 550 and also may be referred to herein as ceasing the decreasing at 530, ceasing the maintaining at 540, and/or ceasing the compacting at 550. The increasing at 560 may be quantified and/or measured with the pressure transducer, as discussed herein.

The charge of composite material may include and/or be a first charge of composite material, and the repeating at 570 may include repeating to sequentially compact another, a second, a subsequent, and/or a plurality of charges of composite material on the supporting surface. The repeating at 570 may include repeating any suitable portion of methods 500, such as the positioning at 510, the positioning at 520, the decreasing at 530, the maintaining at 540, the compacting at 550, and/or the increasing at 560. It is within the scope of the present disclosure that, prior to repeating the positioning at 510, the repeating at 570 may include separating the vacuum compaction device from the supporting surface to permit and/or facilitate the positioning at 510.

The repeating at 570 may include repeating with, or utilizing, the same, or a single, vacuum compaction device and may include repeating without damage to the vacuum compaction device. As an example, the repeating at 570 may include transitioning the vacuum compaction device from the undeformed configuration to the deformed configuration and subsequently returning the vacuum compaction device to the undeformed configuration a plurality of times.

The repeating at 570 also may include positioning the vacuum compaction device at a plurality of different, distinct, and/or spaced-apart locations along a length of the supporting surface to compact an entirety of a length of the charge of composite material to the supporting surface. The repeating at 570 additionally or alternatively may include repeating to compact a plurality of charges of composite material at a given location along the length of the supporting surface and/or to form a composite structure that includes a plurality of stacked, or layered, plies of composite material.

When the repeating at 570 includes repeating along the length of the supporting surface, the repeating at 570 further may include partially overlapping a second location of the plurality of locations with a first location of the plurality of locations, such as to permit and/or ensure complete compaction of an entirety of the length of the charge of composite material. The repeating at 570 additionally or alternatively may include utilizing a plurality of separate and/or distinct vacuum compaction devices to compact the charge of composite material. Under these conditions, the plurality of separate and/or distinct vacuum compaction devices may be utilized to simultaneously compact the charge of composite material in at least two of the plurality of spaced-apart locations.

The devices, systems, and methods for compacting a charge of composite material across an edge, which are disclosed herein, may present several distinct benefits and/or advantages over conventional devices, systems, and methods that historically have been utilized to compact a charge of composite material across an edge. As examples, and when compared to prior art "bagging" processes, the devices, systems, and methods disclosed herein may be much more efficient, may be performed much more quickly, may more fully compact a charge of composite material, and/or may require fewer repetitive motions by an operator. As additional examples, vacuum compaction devices 300 disclosed herein may be much lighter and/or more ergonomic when compared to prior art devices, systems, and methods. As a more specific example, handle 370 of FIGS. 3-5 and 14 may permit a single operator to effectively, efficiently, and/or ergonomically operate devices 300 according to the present disclosure. As another more specific example, an overall weight of devices 300 according to the present disclosure may be relatively low, once again permitting more effective, efficient, and/or ergonomic operation, such as by a single operator. As examples, devices 300 may weigh less than 1 kilogram (kg), less than 1.5 kg, less than 2 kg, less than 2.5 kg, less than 3 kg, less than 4 kg, or less than 5 kg.

Figure 17:
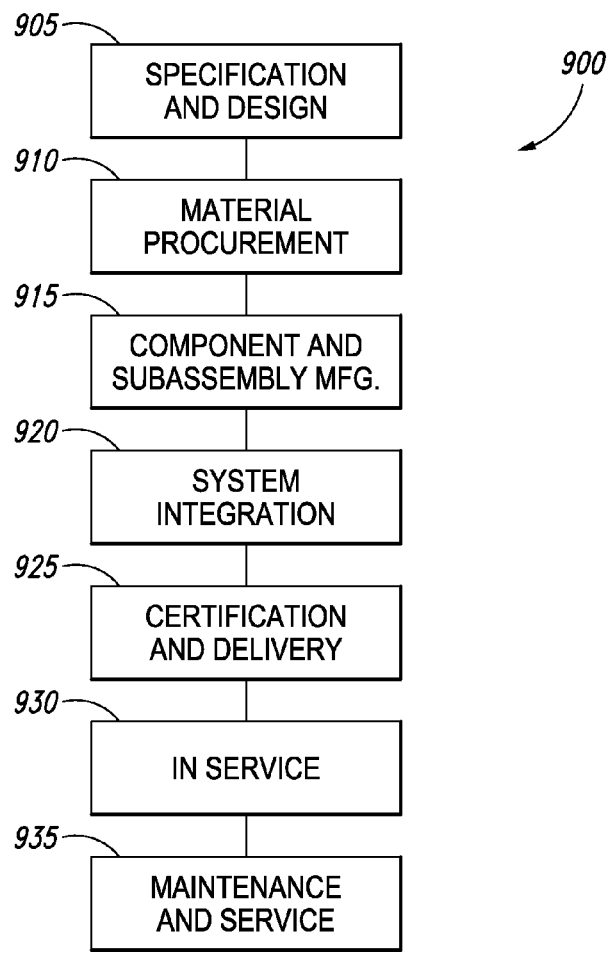
FIG. 17 is a flow diagram of aircraft production and service methodology.
Figure 18:
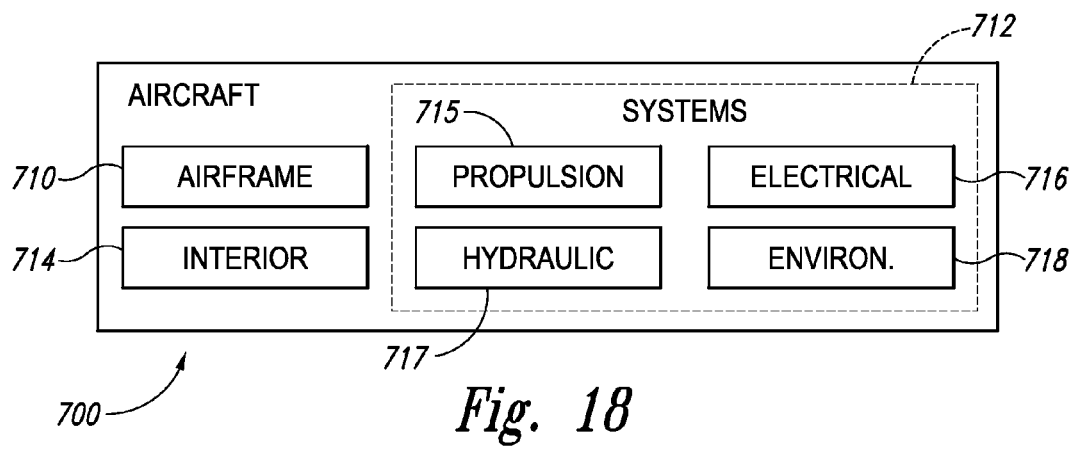
FIG. 18 is a block diagram of an aircraft.

Referring now to FIGS. 17-18, embodiments of the disclosure may be described in the context of an aircraft manufacturing and service method 900, as shown in FIG. 17, and an aircraft 700, as shown in FIG. 18. During pre-production, exemplary method 900 may include specification and design 905 of the aircraft 700 and material procurement 910. During production, component and subassembly manufacturing 915 system integration 920 of the aircraft 700 takes place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 18, the aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Systems and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more system embodiments, method embodiments, or a combination thereof may be utilized during the production stages 915 and 920, for example, by substantially expediting assembly of or reducing the cost of an aircraft 700. Similarly, one or more of system embodiments, method embodiments, or a combination thereof may be utilized while the aircraft 700 is in service, for example and without limitation, to maintenance and service 935.

Examples of inventive subject matter according to the present disclosure are described in the following enumerated paragraphs:

A1. A vacuum compaction device for compacting a charge of composite material on a supporting surface, wherein the supporting surface includes an edge that extends between a first charge-supporting surface of the supporting surface and a second charge-supporting surface of the supporting surface, and further wherein the vacuum compaction device is configured to be operatively positioned on the supporting surface and to extend across the first charge-supporting surface, the second charge-supporting surface, and the edge to define an enclosed volume between the vacuum compaction device and the supporting surface, the vacuum compaction device comprising:

a compaction force transfer structure, including:

(i) a first barrier structure that includes a first charge-facing side and a first charge-opposed side;

(ii) a second barrier structure that includes a second charge-facing side and a second charge-opposed side; and (iii) a junction support extending at least partially between the first barrier structure and the second barrier structure, wherein the junction support is configured to maintain the first barrier structure and the second barrier structure at an angle with respect to one another and to permit limited angular motion of the first barrier structure and the second barrier structure relative to one another;

a sealing structure projecting from an external periphery of the compaction force transfer structure and configured to define at least a portion of a periphery of the enclosed volume when the vacuum compaction device is operatively positioned on the supporting surface; and a vacuum distribution manifold in fluid communication with and configured to selectively apply a vacuum to the enclosed volume.

A2. The device of paragraph A1, wherein the junction support extends between a portion of the first barrier structure that defines the first charge-opposed side and a portion of the second barrier structure that defines the second charge-opposed side.

A3. The device of paragraph A2, wherein a portion of the first barrier structure that defines the first charge-facing side is in direct physical contact with, or defined by a same structure as, a portion of the second barrier structure that defines the second charge-facing side.

A4. The device of any of paragraphs A1-A3, wherein the junction support extends between an entirety of the first barrier structure and an entirety of the second barrier structure.

A5. The device of any of paragraphs A1-A4, wherein the junction support operatively couples the first barrier structure to the second barrier structure.

A6. The device of paragraph A5, wherein the junction support is operatively attached to a first edge of the first barrier structure and also to a second edge of the second barrier structure.

A7. The device of any of paragraphs A1-A6, wherein the junction support is configured to permit limited rotation of the first barrier structure and the second barrier structure relative to one another.

A8. The device of any of paragraphs A1-A7, wherein the junction support is configured to permit limited translation of the first barrier structure and the second barrier structure relative to one another.

A9. The device of any of paragraphs A1-A8, wherein the junction support extends directly between the first barrier structure and the second barrier structure.

A10. The device of any of paragraphs A1-A9, wherein the junction support includes a rigid, or at least substantially rigid, junction support body.

A11. The device of paragraph A10, wherein the junction support body includes a polymeric tube.

A12. The device of any of paragraphs A1-A11, wherein the junction support includes an elastomeric material.

A13. The device of paragraph A12, wherein the elastomeric material indirectly adheres the first barrier structure to the second barrier structure.

A14. The device of any of paragraphs A12-A13, wherein the elastomeric material is molded to form the junction support.

A15. The device of any of paragraphs A1-A14, wherein the junction support is formed from at least one of a polymeric material, a latex, and a urethane.

A16. The device of any of paragraphs A1-A15, wherein the junction support extends at least partially within a first junction recess, which is at least partially defined by the first barrier structure, and a second junction recess, which is at least partially defined by the second barrier structure.

A17. The device of any of paragraphs A1-A16, wherein the junction support is configured to permit the angle between the first barrier structure and the second barrier structure to vary by at least a threshold angle variation.

A18. The device of paragraph A17, wherein the threshold angle variation is at least 5, at least 10, at least 15, at least 20, at least 25, or at least 30 degrees.

A19. The device of any of paragraphs A17-A18, wherein the threshold angle variation is less than 90, less than 80, less than 70, less than 60, less than 50, less than 40, or less than 30 degrees.

A20. The device of any of paragraphs A1-A19, wherein, when the vacuum compaction device is compacting the charge of composite material on the supporting surface, the junction support is configured to conform to at least a threshold range of radii of curvature of a portion of the charge of composite material that extends around the edge of the supporting surface.

A21. The device of paragraph A20, wherein the threshold range of radii of curvature is bounded by a minimum radius of curvature and a maximum radius of curvature, wherein the maximum radius of curvature is at least 1.5, at least 2, at least 2.5, at least 3, at least 3.5, at least 4, at least 5, at least 6, at least 8, or at least 10 times the minimum radius of curvature.

A22. The device of any of paragraphs A1-A21, wherein the angle is at least one of:
(i) greater than 0 degrees, at least 20 degrees, at least 30 degrees, at least 45 degrees, at least 60 degrees, or at least 75 degrees;
(ii) less than 180 degrees, less than 160 degrees, less than 150 degrees, less than 135 degrees, less than 120 degrees, or less than 105 degrees;
(iii) approximately 90 degrees or 90 degrees;
(iv) an acute angle; and
(v) an obtuse angle.

A23. The device of any of paragraphs A1-A22, wherein the junction support is formed from a junction material that at least one of:
(i) does not adhere to the supporting surface;
(ii) does not adhere to the charge of composite material;
(iii) does not chemically react with the supporting surface;
(iv) does not chemically react with the charge of composite material;
(v) does not transfer a contaminant to the supporting surface; and
(vi) does not transfer a contaminant to the charge of composite material.

A24. The device of any of paragraphs A1-A23, wherein the junction support is a first junction support, wherein the compaction force transfer structure further includes:
(i) a third barrier structure that includes a third charge-facing side and a third charge-opposed side;
(ii) a second junction support extending at least partially between the first barrier structure and the third barrier structure; and
(iii) a third junction support extending at least partially between the second barrier structure and the third barrier structure.

A25. The device of paragraph A24, wherein the vacuum compaction device is configured to compact the charge of composite material to a corner.

A26. The device of any of paragraphs A1-A25, wherein the sealing structure is adhered to the compaction force transfer structure.

A27. The device of any of paragraphs A1-A26, wherein the sealing structure extends at least partially within a first peripheral recess, which is at least partially defined by the first barrier structure, and a second peripheral recess, which is at least partially defined by the second barrier structure.

A28. The device of any of paragraphs A1-A27, wherein the sealing structure does not extend between the first charge-facing side of the first barrier structure and the supporting surface when the vacuum compaction device is operatively positioned on the supporting surface.

A29. The device of any of paragraphs A1-A28, wherein the sealing structure does not extend between the second charge-facing side of the second barrier structure and the supporting surface when the vacuum compaction device is operatively positioned on the supporting surface.

A30. The device of any of paragraphs A1-A29, wherein the sealing structure is formed from a sealing material that at least one of:
(i) does not adhere to the supporting surface;
(ii) does not adhere to the charge of composite material;
(iii) does not chemically react with the supporting surface;
(iv) does not chemically react with the charge of composite material;
(v) does not transfer a contaminant to the supporting surface; and
(vi) does not transfer a contaminant to the charge of composite material.

A31. The device of any of paragraphs A1-A30, wherein the sealing structure is formed from at least one of a resilient material, an elastomeric material, a polymeric material, a latex, and a urethane.

A32. The device of any of paragraphs A1-A31, wherein the sealing structure includes, and optionally is, a lip seal.

A33. The device of any of paragraphs A1-A32, wherein the sealing structure is a cast sealing structure that is cast around the external periphery of the compaction force transfer structure.

A34. The device of any of paragraphs A1-A33, wherein the sealing structure is a tapered sealing structure that tapers away from the compaction force transfer structure.

A35. The device of any of paragraphs A1-A34, wherein the sealing structure is configured to stretch a portion of the charge of composite material that extends within the enclosed volume when the vacuum compaction device is operatively positioned on the supporting surface and the vacuum is applied to the enclosed volume.

A36. The device of any of paragraphs A1-A35, wherein the vacuum distribution manifold is at least partially defined by at least one, and optionally both, of the first barrier structure and the second barrier structure.

A37. The device of paragraph A36, wherein the vacuum compaction device further includes a vacuum conduit that extends between the first barrier structure and the second barrier structure to apply the vacuum between a portion of the vacuum distribution manifold that is defined by the first barrier structure and a portion of the vacuum distribution manifold that is defined by the second barrier structure.

A38. The device of paragraph A37, wherein the vacuum conduit extends at least partially within the junction support.

A39. The device of any of paragraphs A37-A38, wherein the vacuum conduit extends between the first charge-opposed side of the first barrier structure and the second charge-opposed side of the second barrier structure.

A40. The device of any of paragraphs A1-A39, wherein the vacuum compaction device further includes at least one of:
(i) a pressure detector configured to detect a pressure within the vacuum distribution manifold; and
(ii) a pressure gauge configured to indicate the pressure within the vacuum distribution manifold.

A41. The device of any of paragraphs A1-A40, wherein the vacuum compaction device further includes a handle configured to facilitate operation of the vacuum compaction device by an operator.

A42. The device of paragraph A41, wherein the handle forms a portion of the vacuum distribution manifold.

A43. The device of any of paragraphs A41-A42, wherein at least one of:
(i) a/the pressure detector is operatively attached to the handle; and
(ii) a/the pressure gauge is operatively attached to the handle.

A44. The device of any of paragraphs A41-A43, wherein the vacuum compaction device further includes a vacuum source configured to selectively generate the vacuum, and further wherein the vacuum source is operatively attached to the handle and is in fluid communication with the vacuum distribution manifold via the handle.

A45. The device of any of paragraphs A41-A43, wherein the vacuum distribution manifold includes a fluid exhaust port that is at least partially defined by the handle.

A46. The device of any of paragraphs A1-A45, wherein the vacuum compaction device further includes a/the vacuum source configured to selectively generate the vacuum.

A47. The device of paragraph A46, wherein the vacuum source is a pneumatically powered vacuum source.

A48. The device of any of paragraphs A46-A47, wherein the vacuum source is a venturi.

A49. The device of any of paragraphs A46-A48, wherein the vacuum source is a tunable vacuum source configured to permit an/the operator to select a magnitude of the vacuum.

A50. The device of any of paragraphs A46-A49, wherein, when the vacuum compaction device is operatively positioned on the supporting surface and the vacuum source is applying the vacuum to the enclosed volume, the vacuum compaction device is configured to generate at least a threshold vacuum level within the enclosed volume.

A51. The device of paragraph A50, wherein the threshold vacuum level is at least 30 kilopascals (kPa), at least 40 kPa, at least 50 kPa, at least 60 kPa, at least 70 kPa, at least 80 kPa, or at least 90 kPa.

A52. The device of any of paragraphs A1-A51, wherein at least one of:
(i) the first barrier structure is an elongate first barrier structure; and
(ii) the second barrier structure is an elongate second barrier structure.

A53. The device of any of paragraphs A1-A52, wherein the first barrier structure has a first length, which is measured along the first charge-opposed side, a first width, which is measured along the first charge-opposed side, and a first thickness, which is measured between the first charge-facing side and the first charge-opposed side, wherein the second barrier structure has a second length, which is measured along the second charge-opposed side, a second width, which is measured along the second charge-opposed side, and a second thickness, which is measured between the second charge-facing side and the second charge-opposed side, and further wherein at least one of:
(i) a ratio of the first length to the first width is at least 1, at least 2, at least 3, at least 4, at least 5, at least 6, at least 7, at least 8, at least 9, or at least 10;
(ii) a ratio of the second length to the second width is at least 1, at least 2, at least 3, at least 4, at least 5, at least 6, at least 7, at least 8, at least 9, or at least 10;
(iii) the first length is equal, or at least substantially equal, to the second length;
(iv) the first width is equal, or at least substantially equal, to the second width;
(v) a ratio of the first width to the first thickness is at least 5, at least 10, at least 15, at least 20, at least 25, or at least 30; and
(v) a ratio of the second width to the second thickness is at least 5, at least 10, at least 15, at least 20, at least 25, or at least 30.

A54. The device of paragraph A53, wherein the junction support extends along, or at least substantially along, the first length of the first barrier structure and also along, or at least substantially along, the second length of the second barrier structure.

A55. The device of any of paragraphs A53-A54, wherein the junction support extends along an entirety of the first length of the first barrier structure and also along an entirety of the second length of the second barrier structure.

A56. The device of any of paragraphs A53-A55, wherein the first length of the first barrier structure and the second length of the second barrier structure are at least one of:
(i) at least 0.5 meter (m), at least 0.75 m, at least 1 m, at least 1.25 m, at least 1.5 m, at least 1.75 m, at least 2 m, at least 2.25 m, or at least 2.5 m; and
(ii) less than 5 m, less than 4.5 m, less than 4 m, less than 3.5 m, less than 3 m, less than 2.5 m, less than 2.25 m, less than 2 m, less than 1.75 m, less than 1.5 m, less than 1.25 m, or less than 1 m.

A57. The device of any of paragraphs A1-A56, wherein the charge of composite material has a charge length, and further wherein the vacuum compaction device has a device length that is less than the charge length.

A58. The device of paragraph A57, wherein the device length is less than 50 percent, less than 40 percent, less than 30 percent, less than 20 percent, less than 10 percent, less than 8 percent, less than 6 percent, less than 5 percent, less than 4 percent, less than 3 percent, or less than 2 percent of the charge length.

A59. The device of any of paragraphs A1-A58, wherein at least one of:
(i) the first barrier structure is a planar, or at least substantially planar, first barrier structure; and
(ii) the second barrier structure is a planar, or at least substantially planar, second barrier structure.

A60. The device of any of paragraphs A1-A59, wherein the first barrier structure and the second barrier structure are formed from at least one of a flexible material, a resilient material, an incompressible material, an at least substantially incompressible material, an inelastic material, a non-elastomeric material, a semi-stiff material, a semi-compliant material, and a semi-rigid material.

A61. The device of any of paragraphs A1-A60, wherein the first barrier structure and the second barrier structure are formed from a barrier structure material with a Young's modulus of at least one of:
(i) at least 1 gigapascal (GPa), at least 1.25 GPa, at least 1.5 GPa, at least 1.75 GPa, at least 2 GPa, at least 2.25 GPa, or at least 2.5 GPa; and (ii) less than 4 GPa, less than 3.75 GPa, less than 3.5 GPa, less than 3.25 GPa, less than 3 GPa, less than 2.75 GPa, less than 2.5 GPa, less than 2.25 GPa, or less than 2 GPa.

A62. The device of any of paragraphs A1-A61, wherein the first barrier structure and the second barrier structure are formed from at least one of a polymeric material and a polycarbonate.

A63. The device of any of paragraphs A1-A62, wherein the first charge-facing side of the first barrier structure further includes a release surface, wherein the second charge-facing side of the second barrier structure further includes the release surface, and optionally wherein the release surface includes at least one of a material that is selected to not adhere to the charge of composite material, a material that is selected to not react with the charge of composite material, and a fluoropolymer.

A64. The device of any of paragraphs A1-A63, wherein the first charge-facing side of the first barrier structure and the second charge-facing side of the second barrier structure include a plurality of evacuation conduits that provide fluid communication between the vacuum distribution manifold and the enclosed volume.

A65. The device of any of paragraphs A1-A64, wherein each of the first barrier structure and the second barrier structure is defined by a respective double-walled panel.

A66. The device of paragraph A65, wherein the respective double-walled panel is defined by a charge-facing planar wall, which defines a charge-facing side of the respective double-walled panel, a charge-opposed planar wall, which defines a charge-opposed side of the respective double-walled panel, and a plurality of elongate webs that extends between the charge-facing planar wall and the charge-opposed planar wall.

A67. The device of any of paragraphs A65-A66, wherein the charge-facing planar wall, the charge-opposed planar wall, and the plurality of elongate webs together define a plurality of elongate channels that optionally extends from an edge of the respective double-walled panel, and further optionally extends between a first edge of the respective double-walled panel and a second edge of the respective double-walled panel.

A68. The device of paragraph A67, wherein the edge of the respective double-walled panel forms at least a portion of the external periphery of the compaction force transfer structure, and further wherein the sealing structure fluidly seals the plurality of elongate channels at the edge of the respective double-walled panel.

A69. The device of any of paragraphs A67-A68, wherein the respective double-walled panel defines a/the plurality of evacuation conduits that extends between at least one of the plurality of elongate channels and the respective charge-facing side of the respective double-walled panel to provide fluid communication between the vacuum distribution manifold and the enclosed volume.

A70. The device of any of paragraphs A67-A69, wherein the plurality of elongate channels defines at least a portion of the vacuum distribution manifold.

A71. The device of any of paragraphs A1-A70, wherein at least a portion of the enclosed volume is bounded by the supporting surface when the vacuum compaction device is operatively positioned on the supporting surface.

A72. The device of any of paragraphs A1-A71, wherein at least a portion of the enclosed volume is bounded by the compaction force transfer structure when the vacuum compaction device is operatively positioned on the supporting surface.

A73. The device of any of paragraphs A1-A72, wherein the supporting surface includes at least one, and optionally both, of a layup mandrel and a previously compacted charge of composite material.

A74. The device of any of paragraphs A1-A73, wherein the supporting surface includes a previously compacted charge of composite material, and further wherein the sealing structure is configured to form the fluid seal between the previously compacted charge of composite material and the compaction force transfer structure.

A75. The device of any of paragraphs A1-A74, wherein the vacuum compaction device includes an undeformed configuration when not operatively positioned on the supporting surface and the vacuum is not applied to the enclosed volume and a deformed configuration when operatively positioned on the supporting surface and the vacuum is applied to the enclosed volume.

A76. The device of paragraph A75, wherein the first barrier structure and the second barrier structure are at least substantially planar when the vacuum compaction device is in the undeformed configuration, and further wherein the first barrier structure and the second barrier structure at least partially conform to a surface contour of the supporting surface when the vacuum compaction device is in the deformed configuration, optionally wherein the surface contour of the supporting surface includes at least one of a non-planar surface contour, a concave surface contour, a convex surface contour, an arcuate surface contour, and/or an angular surface contour.

A77. The device of any of paragraphs A1-A76, wherein the charge of composite material forms a portion of at least one of a composite structure, an airframe, a fuselage of an aircraft, a fuselage barrel of an aircraft, a wing of an aircraft, a stabilizer of an aircraft, a filler, a skin, a stringer, and a blade stringer.

A78. The device of any of paragraphs A1-A77, wherein the vacuum compaction device is a reusable vacuum compaction device, optionally wherein the reusable vacuum compaction device is configured to compact a plurality of charges of composite material on the supporting surface at a plurality of different locations along a length of the supporting surface, optionally without damage to the vacuum compaction device.

B1. A composite structure fabrication system comprising:
a plurality of charges of composite material;
a supporting surface; and
the vacuum compaction device of any of paragraphs A1-A78.

B2. The system of paragraph B1 further comprising a layup mandrel, wherein the layup mandrel forms at least a portion of the supporting surface.

B3. The system of any of paragraphs B1-B2, wherein the vacuum compaction device is operatively positioned on the supporting surface and defines the enclosed volume, wherein the charge of composite material is positioned within the enclosed volume, wherein the vacuum is applied to the enclosed volume, and further wherein a contour of the compaction force transfer structure corresponds to a surface contour of the supporting surface, and optionally wherein the contour of the supporting surface is at least one of a non-planar surface contour, a concave surface contour, a convex surface contour, an arcuate surface contour, and an angular surface contour.

B4. The system of any of paragraphs B1-B3, wherein the supporting surface is further defined by a previously compacted charge of composite material.

B5. The system of any of paragraphs B1-B4, wherein the charge of composite material defines a stepped profile.

B6. The system of any of paragraphs B1-B5, wherein the vacuum compaction device is a first vacuum compaction device, wherein the system includes a plurality of vacuum compaction devices, and further wherein each vacuum compaction device in the plurality of vacuum compaction devices is operatively positioned on a respective portion of the supporting surface and defines a respective enclosed volume.

B7. The system of any of paragraphs B1-B6, wherein each charge of composite material of the plurality of charges of composite material includes at least one of:
(i) at least 1 ply of composite material;
(ii) at least 2, at least 3, at least 4, at least 5, at least 10, at least 15, or at least 20 stacked plies of composite material; and
(iii) fewer than 80, fewer than 70, fewer than 60, fewer than 50, fewer than 45, fewer than 40, fewer than 35, fewer than 30, fewer than 25, fewer than 20, fewer than 15, or fewer than 10 stacked plies of composite material.

B8. The system of any of paragraphs B1-B7, wherein the composite material includes a plurality of fibers, optionally wherein the plurality of fibers includes at least one of a plurality of carbon fibers, a plurality of polymeric fibers, and a plurality of glass fibers.

B9. The system of any of paragraphs B1-B8, wherein the composite material includes a resin material, and optionally wherein the resin material includes at least one of an epoxy, an adhesive, and a polymeric resin.

B10. The system of any of paragraphs B1-B9, wherein the composite material includes a pre-impregnated composite material.

C1. A method of compacting a charge of composite material on a supporting surface, the method comprising:
positioning the charge of composite material on the supporting surface;
positioning a vacuum compaction device on the supporting surface to define an enclosed volume that contains at least a portion of the charge of composite material, wherein the vacuum compaction device includes a compaction force transfer structure that includes a first barrier structure, a second barrier structure, and a junction support that extends at least partially between the first barrier structure and the second barrier structure, wherein the positioning includes extending the vacuum compaction device across an edge of the supporting surface, which extends between a first charge-supporting surface of the supporting surface and a second charge-supporting surface of the supporting surface, such that the first barrier structure extends across the first charge-supporting surface, such that the second barrier structure extends across the second charge-supporting surface, and also such that the junction support extends along the edge;
decreasing a pressure within the enclosed volume to transition the vacuum compaction device from an undeformed configuration to a deformed configuration that is different from the undeformed configuration;
responsive to the decreasing, compacting the charge of composite material between the vacuum compaction device and the supporting surface; and
subsequent to the compacting, increasing the pressure within the enclosed volume to return the vacuum compaction device to the undeformed configuration.

C2. The method of paragraph C1, wherein the vacuum compaction device further includes a sealing structure that extends around an external periphery of the compaction force transfer structure.

C3. The method of paragraph C2, wherein the decreasing includes forming a fluid seal, with the sealing structure, between the supporting surface and the compaction force transfer structure.

C4. The method of any of paragraphs C2-C3, wherein the positioning the vacuum compaction device includes contacting the sealing structure with the supporting surface.

C5. The method of any of paragraphs C2-C4, wherein a portion of the supporting surface is defined by a layup mandrel, and further wherein the positioning the vacuum compaction device includes contacting the sealing structure with the layup mandrel.

C6. The method of any of paragraphs C2-05, wherein a portion of the supporting surface is defined by a previously compacted charge of composite material, and further wherein the positioning the vacuum compaction device includes contacting the sealing structure with the previously compacted charge of composite material.

C7. The method of any of paragraphs C1-C6, wherein the charge of composite material is a first charge of composite material, wherein the positioning the charge of composite material includes positioning a plurality of charges of composite material, wherein the positioning the vacuum compaction device includes positioning the vacuum compaction device such that the enclosed volume contains the plurality of charges of composite material, and further wherein the compacting includes simultaneously compacting the plurality of charges of composite material.

C8. The method of any of paragraphs C1-C7, wherein the method includes compacting the charge of composite material without vacuum bagging the charge of composite material.

C9. The method of any of paragraphs C1-C8, wherein the method does not include forming an adhesive bond between the vacuum compaction device and the supporting surface.

C10. The method of any of paragraphs C1-C9, wherein the charge of composite material is a first charge of composite material, and further wherein the method includes repeating the method to compact a/the plurality of charges of composite material on the supporting surface.

C11. The method of paragraph C10, wherein the repeating includes transitioning the vacuum compaction device from the undeformed configuration to the deformed configuration and subsequently returning the vacuum compaction device to the undeformed configuration a plurality of times.

C12. The method of any of paragraphs C10-C11, wherein the repeating includes repeating without damage to the vacuum compaction device.

C13. The method of any of paragraphs C10-C12, wherein the repeating includes positioning the vacuum compaction device at a plurality of spaced-apart locations along a length of the supporting surface to compact an entirety of a length of the charge of composite material.

C14. The method of paragraph C13, wherein the method further includes partially overlapping a second location of the plurality of spaced-apart locations with a first location of the plurality of spaced-apart locations.

C15. The method of any of paragraphs C13-C14, wherein the repeating includes utilizing a plurality of vacuum compaction devices to simultaneously compact the charge of composite material in at least two of the plurality of spaced-apart locations.

C16. The method of any of paragraphs C1-C15, wherein, subsequent to the decreasing and prior to the increasing, the method further includes maintaining at least a threshold vacuum level within the enclosed volume for at least a threshold compaction time.

C17. The method of paragraph C16, wherein the threshold compaction time is at least one of:

(i) at least 1 second, at least 2 seconds, at least 3 seconds, at least 4 seconds, at least 5 seconds, at least 10 seconds, at least 15 seconds, at least 20 seconds, at least 30 seconds, at least 45 seconds, or at least 60 seconds; and (ii) less than 90 seconds, less than 75 seconds, less than 60 seconds, less than 45 seconds, less than 30 seconds, less than 15 seconds, less than 10 seconds, less than 8 seconds, less than 6 seconds, or less than 5 seconds.

C18. The method of any of paragraphs C16-C17, wherein the threshold vacuum level is at least 30 kilopascals (kPa), at least 40 kPa, at least 50 kPa, at least 60 kPa, at least 70 kPa, at least 80 kPa, or at least 90 kPa.

C19. The method of any of paragraphs C1-C18, wherein the vacuum compaction device includes the vacuum compaction device of any of paragraphs A1-A78.

D1. The use of any of the devices of any of paragraphs A1-A78 or any of the systems of any of paragraphs B1-1310 with any of the methods of any of paragraphs C1-C19.

D2. The use of any of the methods of any of paragraphs C1-C19 with any of the devices of any of paragraphs A1-A78 or any of the systems of any of paragraphs B1-810.

D3. The use of any of the devices of any of paragraphs A1-A78, any of the systems of any of paragraphs B1-810, or any of the methods of any of paragraphs C1-C19 to compact a charge of composite material.

D4. The use of any of the devices of any of paragraphs A1-A78, any of the systems of any of paragraphs B1-810, or any of the methods of any of paragraphs C1-C19 to form a portion of a composite structure.

D5. The use of any of the devices of any of paragraphs A1-A78, any of the systems of any of paragraphs B1-810, or any of the methods of any of paragraphs C1-C19 to form a portion of at least one of an airframe, a fuselage of an aircraft, a fuselage barrel of an aircraft, a wing of an aircraft, a stabilizer of an aircraft, a filler, a skin, and a stringer.

D6. The use of a reusable vacuum compaction device to compact a charge of composite material across an edge of a forming surface.

D7. The use of a reusable vacuum compaction device to conform a charge of composite material to an edge of a forming surface.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of devices and/or systems, and steps of methods, disclosed herein are not required to all devices, systems, and/or methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed device, system, and/or method. Accordingly, such inventive subject matter is not required to be associated with the specific devices, systems, and/or methods that are expressly disclosed herein, and such inventive subject matter may find utility in devices, systems, and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A vacuum compaction device for compacting a charge of composite material on a supporting surface, wherein the supporting surface includes an edge that extends between a first charge-supporting surface of the supporting surface and a second charge-supporting surface of the supporting surface, and further wherein the vacuum compaction device is configured to be operatively positioned on the supporting surface and to extend across the first charge-supporting surface, the second charge-supporting surface, and the edge to define an enclosed volume between the vacuum compaction device and the supporting surface, the vacuum compaction device comprising:

a compaction force transfer structure, including:
(i) a first barrier structure that includes a first charge-facing side and a first charge-opposed side;
(ii) a second barrier structure that includes a second charge-facing side and a second charge-opposed side; and
(iii) a junction support extending at least partially between the first barrier structure and the second barrier structure, wherein the junction support is configured to maintain the first barrier structure and the second barrier structure at an angle with respect to one another and to permit limited angular motion of the first barrier structure and the second barrier structure relative to one another;

a sealing structure projecting from an external periphery of the compaction force transfer structure and configured to define at least a portion of a periphery of the enclosed volume when the vacuum compaction device is operatively positioned on the supporting surface; and a vacuum distribution manifold in fluid communication with and configured to selectively apply a vacuum to the enclosed volume.

2. The device of claim 1, wherein the junction support extends between a portion of the first barrier structure that defines the first charge-opposed side and a portion of the second barrier structure that defines the second charge-opposed side.

3. The device of claim 1, wherein the junction support extends between an entirety of the first barrier structure and an entirety of the second barrier structure and operatively couples the first barrier structure to the second barrier structure.

4. The device of claim 1, wherein the junction support is configured to permit limited rotation of the first barrier structure and the second barrier structure relative to one another.

5. The device of claim 1, wherein the junction support is configured to permit limited translation of the first barrier structure and the second barrier structure relative to one another.

6. The device of claim 1, wherein the junction support includes an elastomeric material, wherein the elastomeric material indirectly adheres the first barrier structure to the second barrier structure.

7. The device of claim 1, wherein the junction support extends at least partially within a first junction recess, which is at least partially defined by the first barrier structure, and a second junction recess, which is at least partially defined by the second barrier structure.

8. The device of claim 1, wherein, when the vacuum compaction device is compacting the charge of composite material on the supporting surface, the junction support is configured to conform to at least a threshold range of radii of curvature of a portion of the charge of composite material that extends around the edge of the supporting surface, wherein the threshold range of radii of curvature is bounded by a minimum radius of curvature and a maximum radius of curvature, and further wherein the maximum radius of curvature is at least 5 times the minimum radius of curvature.

9. The device of claim 1, wherein the sealing structure extends at least partially within a first peripheral recess, which is at least partially defined by the first barrier structure, and a second peripheral recess, which is at least partially defined by the second barrier structure.

10. The device of claim 1, wherein the sealing structure includes at least one of a lip seal and a tapered sealing structure that tapers away from the compaction force transfer structure.

11. The device of claim 1, wherein the sealing structure is configured to stretch a portion of the charge of composite material that extends within the enclosed volume when the vacuum compaction device is operatively positioned on the supporting surface and the vacuum is applied to the enclosed volume.

12. The device of claim 1, wherein the vacuum distribution manifold is at least partially defined by at least one of the first barrier structure and the second barrier structure.

13. The device of claim 12, wherein the vacuum compaction device further includes a vacuum conduit that extends between the first barrier structure and the second barrier structure to apply the vacuum between a portion of the vacuum distribution manifold that is defined by the first barrier structure and a portion of the vacuum distribution manifold that is defined by the second barrier structure.

14. The device of claim 1, wherein the charge of composite material has a charge length, and further wherein the vacuum compaction device has a device length that is less than 20 percent of the charge length.

15. The device of claim 1, wherein the first barrier structure and the second barrier structure are formed from a barrier structure material with a Young's modulus of at least 1 gigapascal (GPa) and less than 4 GPa.

16. The device of claim 1, wherein the first charge-facing side of the first barrier structure and the second charge-facing side of the second barrier structure include a plurality of evacuation conduits that provide fluid communication between the vacuum distribution manifold and the enclosed volume.

17. The device of claim 1, wherein each of the first barrier structure and the second barrier structure is defined by a respective double-walled panel.

18. The device of claim 1, wherein the vacuum compaction device is a reusable vacuum compaction device configured to compact a plurality of charges of composite material on the supporting surface at a plurality of different locations along a length of the supporting surface without damage to the vacuum compaction device.

19. A composite structure fabrication system comprising:
a plurality of charges of composite material;
a supporting surface; and
the vacuum compaction device of claim 1.

20. A method of compacting a charge of composite material on a supporting surface, the method comprising:
positioning the charge of composite material on the supporting surface;
positioning a vacuum compaction device on the supporting surface to define an enclosed volume that contains at least a portion of the charge of composite material, wherein the vacuum compaction device includes a compaction force transfer structure that includes a first barrier structure, a second barrier structure, and a junction support that extends at least partially between the first barrier structure and the second barrier structure, wherein the positioning includes extending the vacuum compaction device across an edge of the supporting surface, which extends between a first charge-supporting surface of the supporting surface and a second charge-supporting surface of the supporting surface, such that the first barrier structure extends across the first charge-supporting surface, such that the second barrier structure extends across the second charge-supporting surface, and also such that the junction support extends along the edge;
decreasing a pressure within the enclosed volume to transition the vacuum compaction device from an undeformed configuration to a deformed configuration that is different from the undeformed configuration;
responsive to the decreasing, compacting the charge of composite material between the vacuum compaction device and the supporting surface; and
subsequent to the compacting, increasing the pressure within the enclosed volume to return the vacuum compaction device to the undeformed configuration.

* * * * *